(12) United States Patent
Hanagami et al.

(10) Patent No.: US 6,687,020 B1
(45) Date of Patent: Feb. 3, 2004

(54) VIDEO PROCESSING APPARATUS AND PRINTING APPARATUS

(75) Inventors: Teruyasu Hanagami, Kanagawa (JP); Koji Yoshino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/066,377

(22) PCT Filed: Aug. 29, 1997

(86) PCT No.: PCT/JP97/03031

§ 371 (c)(1),
(2), (4) Date: Nov. 20, 1998

(87) PCT Pub. No.: WO98/09435

PCT Pub. Date: Mar. 5, 1998

(30) Foreign Application Priority Data

Aug. 30, 1996 (JP) .............................................. 8-230851

(51) Int. Cl.$^7$ .............................................. G06F 15/00
(52) U.S. Cl. ........................ 358/1.2; 358/1.9; 358/1.18; 358/296; 358/444
(58) Field of Search ................................ 358/296, 444, 358/445, 449, 451, 1.2, 1.9, 1.18, 403, 450, 1.16, 1.17, 1.12; 382/47, 305

(56) References Cited

U.S. PATENT DOCUMENTS

| | | | | |
|---|---|---|---|---|
| 5,093,730 A | * | 3/1992 | Ishii et al. .................. | 358/296 |
| 5,115,320 A | * | 5/1992 | Ebihara et al. ............. | 358/296 |
| 5,485,554 A | * | 1/1996 | Lowitz et al. .............. | 358/296 |
| 5,652,661 A | * | 7/1997 | Gallipeau et al. ........... | 358/302 |
| 5,978,551 A | * | 11/1999 | Koyama ..................... | 358/1.2 |

FOREIGN PATENT DOCUMENTS

| | | | |
|---|---|---|---|
| JP | 3-45090 | 2/1991 | |
| JP | 0431796 A3 | 6/1991 | |
| JP | 3-166948 | 7/1991 | |
| JP | 5-191760 | 7/1993 | |
| JP | 6-233224 | * 8/1994 | ............ H04N/5/76 |
| JP | 7-327197 | 12/1995 | |

* cited by examiner

*Primary Examiner*—Edward Coles
*Assistant Examiner*—Twyler Lamb
(74) *Attorney, Agent, or Firm*—Frommer Lawrence & Haug LLP; William S. Frommer; Dennis M. Smid

(57) ABSTRACT

It is an object of the present invention to provide a video processing apparatus which makes it possible to print a picture having an arbitrary size without forging an original picture. A video processing apparatus according to the present invention includes a print size selecting means 51 for selecting a print size of a printer 3 by selecting a size of a picture frame, a CPU 43 for determining the number of pixels of a video data corresponding to the selected print size, and a memory controller 33 for processing the video data in accordance with the number of pixels so that pixels of a video data output from a camera 1 should be in one-to-one correspondence with pixels of a video data to be printed by the printer 3. It is not necessary to subject the original picture to video processings such as a decimating processing, an interpolation processing or the like. Therefore, it is possible to obtain a printed picture having an arbitrary size without forging an original data as required when an attesting photograph is taken.

16 Claims, 10 Drawing Sheets

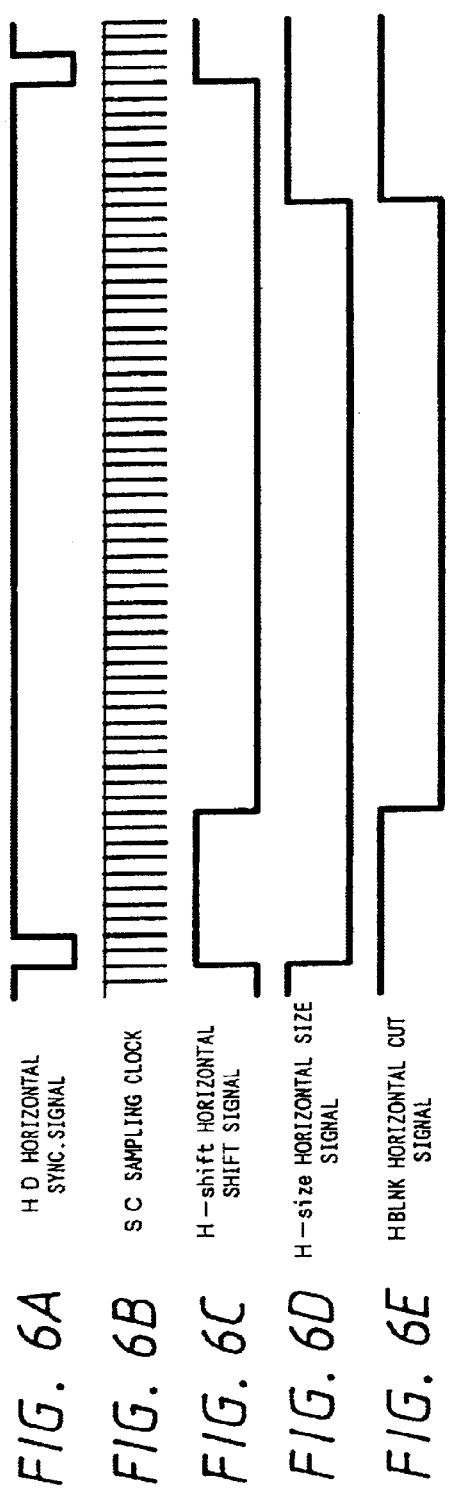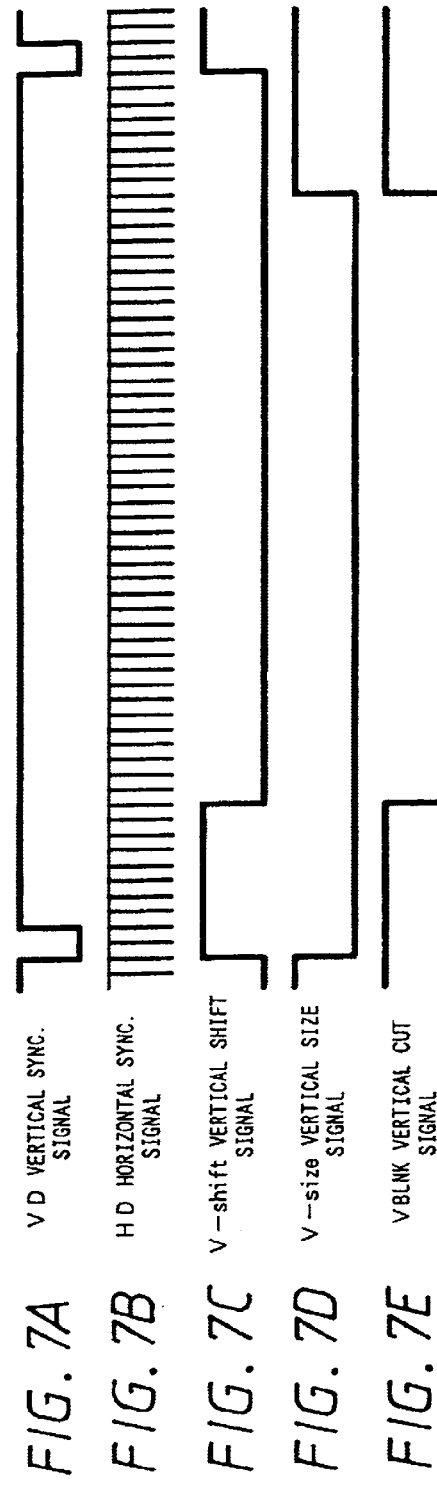
FIG. 6A  H D HORIZONTAL SYNC. SIGNAL
FIG. 6B  S C SAMPLING CLOCK
FIG. 6C  H-shift HORIZONTAL SHIFT SIGNAL
FIG. 6D  H-size HORIZONTAL SIZE SIGNAL
FIG. 6E  HBLNK HORIZONTAL CUT SIGNAL
FIG. 7A  V D VERTICAL SYNC. SIGNAL
FIG. 7B  H D HORIZONTAL SYNC. SIGNAL
FIG. 7C  V-shift VERTICAL SHIFT SIGNAL
FIG. 7D  V-size VERTICAL SIZE SIGNAL
FIG. 7E  VBLNK VERTICAL CUT SIGNAL

FIG. 9

2 MONITOR

WINDOW SETUP
IVP:100

LAY:SETUP
PRESS[>]

H ( 1 6 ~ 5 1 )
             nn mm

V ( 1 6 ~ 5 1 )
             nn mm

SAVE SIZE
1/2/3   EXEC

VIDEO PROCESSING APPARATUS AND PRINTING APPARATUS

TECHNICAL FIELD

The present invention relates to a video processing apparatus, for example, for printing an attesting photograph of an arbitrary size.

BACKGROUND ART

Conventionally, an attesting photograph is attached to an identification card in order to identify a person. Generally, various restrictions are imposed on this attesting photograph because it should be strictly handled. For example, the size is designated and a front photograph without any hat or cap is required and so on. These restrictions are different depending on a kind of the attesting photograph. Specially, the designated sizes are different in every kind depending on its use or convenience.

For example, the size of length and breadth of the attesting photograph of a driving license of motor car is relatively small, whereas the size of length and breadth of the attesting photograph of passport is relatively large. Further, the size of length and breath of the attesting photograph of passport is different in every country depending on administrative or historical circumstances of each country. In the meantime, there was a video printer system for printing the ttesting photograph attached to the identification card. Such video printer system comprises, for example, a video camera, a video printer and a controller for controlling them. This video printer system is systematized for purpose of the attesting photograph and installed fixedly in a booth. The color printer used in such a video camera system is being replaced with a maintenance-free sublimation type printer instead of a silver salt printer using chemicals so that there may be no need to check frequently for maintenance because it is installed fixedly in the booth.

Premising these background, the video printer for printing various kinds of attesting photographs has been in a situation that an individually different setting is reluctantly performed depending on their specifications. In other words, it is impossible for a single video printer to perform all settings for every specification and so there has been no such a video printer to date.

Therefore, makers who systemize the above-mentioned video printer system for the attesting photograph's use is accustomed to choose the printer in accordance with a specification required by a user. Furthermore, in particular, they used to alter the setting of an existing printer to prepare a custom-made equipment, if necessary.

The existing printer has a print size based on a unique print format. However, since the print format has no degree of freedom, it was difficult to obtain a print output of an arbitrary print size. Typically, various functions possessed by each printer, for example, a screen dividing function was utilized to obtain the print output of the respective required print sizes.

However, with the conventional printer, the print output of a specific print size that is predetermined by the screen dividing function can be obtained, by the print output of an arbitrary print size cannot be obtained even by the screen dividing function. Accordingly, the conventional printer cannot by adapted for the aforesaid print size of the attesting photograph and so there has been a particular inconvenience that it cannot deal with the print size of the attesting photograph of the passport in every country.

Moreover, it is conceivable to perform a processing of expansion or reduction of a picture in the video printer so as to expand or reduce the picture size. However, in the expanding process, other data is added to true data by an interpolation processing. In the reducing process, the true data is decimated for processing. Particularly, in a field of the attesting photograph for use with the passport or the driving license, it is inhibited to process freely the true data or to process a picture at discretion by a government of each country because the reliability of the data is lost. That is to say, there has been an inconvenience that the processing of the picture at discretion inside the printer for the arbitrary size should not be performed.

A monitor used in such a video camera system is usually positioned so that horizontal sides may be longer than vertical sides. A on-screen display which is displayed on the monitor at this time, connected with control for operating the color print is accustomed to e displayed in the horizontal direction correspondingly to this position of the monitor.

In this manner, the conventional video camera system is arranged so that the on-screen display for operation the printer may correspond to only the scanning line direction of the monitor with the long horizontal sides (horizontally elongated). However, in the field of the attesting photograph, those of vertically elongated size are often required. Accordingly, it is a practice that a picture which is rotated by 90° in advance and then the vertically elongated picture is displayed on the monitor by rotating the monitor backward by 90°. However in this case, since the on-screen display is displayed in the scanning line direction, namely the vertical direction of the monitor, an operator is forced to turn his face horizontally. Thus, the on-screen display is hard for the operator to read, so that there has been inconvenience that he cannot operate the color printer smoothly.

Moreover, it is conceivable to provide a new controller used exclusively for controlling the operation of the color printer, which controller controls to rotate the on-screen display so that it may be displayed in a direction perpendicular to the scanning line direction, namely the vertical direction of the monitor. However, this leads to an extension of the control system, thereby causing inconvenience that the configuration and the control thereof are reduced complex.

DISCLOSURE OF THE INVENTION

In view of the foregoing points, the present invention has been made and its object is to provide a video processing apparatus in which the print output of the arbitrary print size can be obtained.

A video processing apparatus according to the present invention includes an imaging means for imaging an object through an optical system to obtain an electric signal through conversion and outputting a signal as a video data, a display means for displaying a picture of the video data in a predetermined picture frame, a printing means for printing the picture in the picture frame of the video data, a print size selecting means for selecting a print size of the picture to be printed by the printing means, a pixel-number determining means for determining the number of pixels of the video data corresponding to the print size selected by the print size selecting means, and a video data processing means for processing the video data based on the number of pixels determined by the pixel-number determining means so that the pixels of the video data output from the imaging means should be in one-to-one correspondence with the pixels of the video data printed by the printing means.

A printing apparatus according to the present invention is a printing apparatus for printing an image based on a source video data on a printing paper and includes a storage means for storing the source video data, a reading means for reading a video image stored in the storage means, a printing means for printing an image based on the video data read out by the reading means on the printing paper, and a control means for controlling the reading means and the printing means so that pixels of the source video data should be in one-to-one correspondence with pixels of the video data to be printed on the printing paper.

According to the video processing and the printing apparatus of the present invention, the following operations are carried out.

If an operator wants to select and set a print size by using a print size selecting means, the operator uses the print size selecting means to supply a set signal data corresponding to a set signal used for selecting the print size to the pixel number determining means. The pixel number determining means uses a control data based on the set signal data to thereby determine the number of pixels corresponding to the set print size by calculation. The pixel number determining means determines the number of horizontal-direction pixels based on a head density of the printing means and also determines the number of vertical-direction pixels based on a transmission system of the video data. The pixel number determining means calculates the sampling frequency from the determined number of pixels.

The pixel number determining means supplies the set signal for the above number of pixels and the sampling frequency to the video data processing means. The video data processing means processes the video data based on the number of pixels determined by the pixel number determining means so that the pixels of the video data output from the imaging means should be in one-to-one correspondence with the pixels of the video data to be printed by the printing means. The video data processing means uses the same sampling frequency, based on the above sampling frequency, for sampling the pixels of the video data output from the imaging means and for sampling the pixels of the video data to be printed by the printing means.

The horizontal and vertical cutting means of the video data processing means cuts the picture of the video data in the horizontal or vertical direction based on the number of pixels determined by the pixel-number determining means, thereby generating the window corresponding the number of pixels on the display means. The horizontal and vertical cutting means of the video data processing means cuts the picture of the video data in the horizontal or vertical direction based on the number of pixels determined by the pixel-number determining means, thereby permitting the picture corresponding to the above number of pixels to be printed.

As described above, the display means displays thereon the window based on the cut signal from the horizontal and vertical cutting means and also displays thereon the picture inside the window. The pixels of the video data displayed by the display means are decimated at a predetermined ratio with respect to the pixels of the video data obtained by the image pickup of the imaging means. The picture displayed on the display means is used only for confirming whether or not the picture is located in the window range set for indicating the print size.

The printing means recognizes the print range of the picture based on the cut signal from the horizontal and vertical cutting means. If the operator issues a command to print the picture, since the horizontal and vertical cutting means of the video data processing means supplies the horizontal and vertical cutting signal to the printing means, only the print data formed of the pixels of the video data corresponding to the pixels of the video data in one-to-one correspondence are supplied to the head thereof. Therefore, when the print size is selected through the print size selecting means, it is possible to print the picture having the proper size without forging the video data obtained by the image pickup of the imaging means.

In view of such aspects, it is an object of the present invention to provide a video processing apparatus which carries out an on-screen display when a picture for an attesting photograph is displayed on a monitor having a picture frame which is long in the vertical direction.

A video processing apparatus includes an imaging means for imaging an object through an optical system to obtain an electric signal by conversion and for outputting the electric signal as a video data, a storage means for storing the video data, a character data generating means for generating a character data concerning control of the video data, a display means for displaying a picture of the video data stored in the storage means and the character data generated by the character data generating means, and a printing means for printing the picture displayed on the display means based on the character data. When the picture and the character are displayed on the display means, the character is displayed with being rotated relative to the picture.

According to the video processing and the printing apparatus of the present invention, the following operations are carried out.

A fundamental function will be described. A video data is output from the imaging means and then stored in the storage means. Then, the video data stored in the storage means is read out therefrom for display. Character data such as a menu screen, a setting item or the like supplied from the character data generating means and used for controlling the printing means through operations thereof are mixed with the video data stored in the storage means. The video data mixed with the character data are supplied to the display means. Then, the video data mixed with the character data are displayed on the display means.

The video data stored in the storage means is read out for the printing operation. The video data read out therefrom is subjected to the gamma conversion processing and the signal conversion for the printing operation to thereby be converted into the print data for three colors Y, M, C. The print data is printed by the printing means.

An operation of the on-screen display using the 90°-rotation font will be described. When in this basic operation the control of the on-screen display using the 90°-rotation font is designated, the character data generating means reads out a 90°-rotation font control software dedicated for carrying out the on-screen display by using the 90°-rotation font in the on-screen display processing of the basic operation based on the control signal for the on-screen display using the 90°-rotation font. The character data generating means supplies an address signal based on an address table to a font storage unit in order to generate the characters formed of the 90°-rotation fonts based on the 90°-rotation font control software, and reads out the 90°-rotation fonts to generate the 90°-rotation character data based thereon.

THe character data formed of the 90°-rotation character thus formed are mixed with the video data supplied form the storage means. Thus, the picture and the characters for the on-screen display are displayed on the display means. When the operator operates the printing means based on this on-screen display, various control operations are carried out by the printing means.

If the printing operation by the printing means is designated, the print data is supplied to the printing means. Thus, if the operator sets the printing control items based on the on-screen display displayed by using the 90°-rotation fonts in the lateral direction of the display means which is long in the longitudinal direction, the printing operation can be carried out in the set control state.

BRIEF DESCRIPTION OF DRAWINGS

FIG. 6 is a timing chart showing a timing of generating a horizontal-direction cutting signal of the video processing according to the embodiment of the present invention; FIG. 7 is a timing chart showing a timing of generating a vertical-direction cutting signal of the video processing according to the embodiment of the present invention;

FIG. 9 is a diagram showing a size setting menu of the video processing according to the embodiment of the present invention;

FIG. 13 is a diagram showing a monitor and an on-screen display of the video processing according to the embodiment of the present invention, wherein FIG. 14 is a diagram showing a picture and the on-screen display in a monitor of the video processing according to the embodiment of the present invention, wherein

BEST MODE FOR CARRYING OUT THE INVENTION

A video processing apparatus according to one embodiment of the present invention will be described below. The video processing apparatus according to the present embodiment is to be utilized for taking the attesting photograph of IVP (Instant Video Portrait), etc. in a no man's photograph booth or a studio. Particularly, in the field of the attesting photograph, since the size of the attesting photograph of, for example, the passport is different in every country, the counter measure for replacing with the dividing function owned by the printer has heretofore been attempted. However, since the attesting photograph of various sizes are required by every country as the number of country to be dealt with increases with an extension of market, the apparatus is arranged so that it may be possible to deal with the size of the attesting photograph of the passport of each country by providing a function which presets to change the print size arbitrarily in a millimeter unit.

Figure 1:
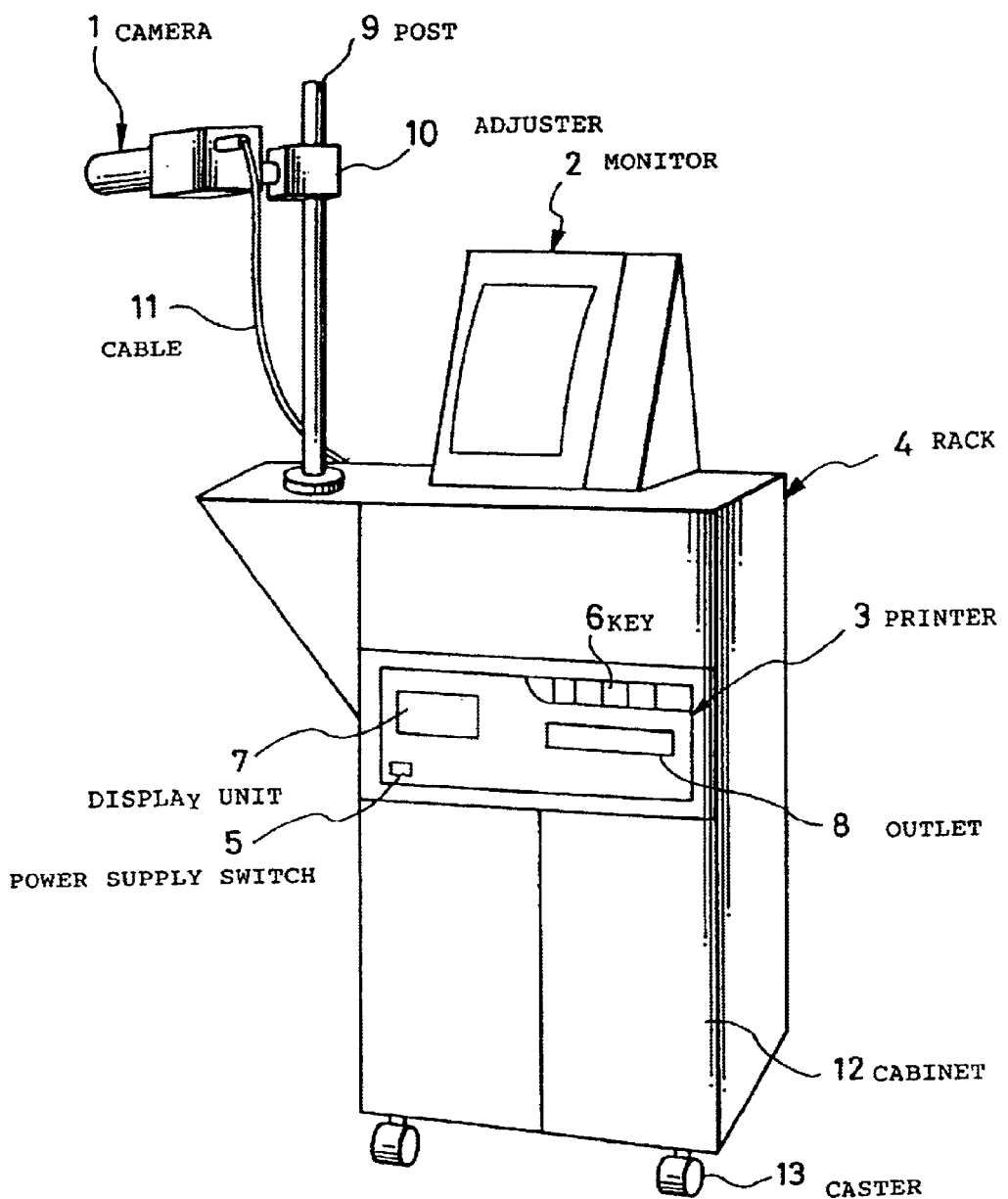
FIG. 1 is a perspective view of an appearance of a video processing apparatus according to an embodiment of the present invention.

AS shown in FIG. 1, the video processing apparatus according to the present embodiment comprises a camera 1 for outputting picture data of three colors of R (red), G (green), B (blue) by imaging an object and then performing a photoelectric conversion, a monitor 2 for displaying a picture based on the picture data supplied from the camera 1, and a printer 3 for outputting a print of the picture displayed on the monitor 2. In FIG. 1, the camera 1, the monitor 2 and the printer 3 are constructed so as to be accommodated in one rack. In detail, the printer 3 is provided in a central portion along a vertical direction of a rack 4 in a manner that a front of the printer is exposed. On the front portion of the printer 3, there are a power supply switch 5 serving also as a power supply switch of the entire video processing apparatus, a key 6 for setting various print sizes and the like, a display portion 85 made of LCD, etc. for displaying a setting item, and an outlet 8 from which a print output is discharged.

The monitor 2 is arranged vertically elongated on a upper end face of the rack 4. In this case, the monitor 2 is arranged in a manner that a direction of scanning lines coincides with the vertical direction and it is slightly oblique upward form the front to the top. The reason therefore is that the attesting photograph is usually taken so as to be vertically elongated because it is to photograph a face and an upper half body of a person to be identified, thus making it easier for an operator to check the picture by comparing between the print output and the display screen of the monitor. In this case, the vertical direction of the scanning lines of the monitor 2 corresponds to a main scanning direction (direction of a head element) of the printer 3 and the horizontal direction of the monitor 2 corresponds to a sub-scanning direction (forwarding direction) of the printer 3. The monitor 2 displays a picture as well as a picture frame called a window indication of a present print size. At this time, a picture portion outside the window of the picture to be displayed on the monitor 2 is masked, so that only a picture inside the window is displayed. In this way, the apparatus is arranged that the picture size is varied.

Furthermore, an upright post 9 is planted beside the monitor 2 on the upper end face of the rack 4, to which post 9 a camera 1 is fixed through an adjuster 10 so as to be movable in a vertical direction. The camera 1 is movable in the vertical direction due to the vertical movement of the adjuster 10 and at the same time the camera is rotatable relative to the adjuster 10. The camera 1 has the zoom function and is arranged to supply the picture data to the monitor 2 and the printer 3 through a cable 11. Also, a cabinet 12 is provided in lower portion of the rack 4 in a manner that the cabinet can receive inside thereof a necessary equipment such as a manual and the like by opening a front door. A caster 13 is fixed at four corners in a bottom portion of the rack, thereby causing the apparatus to be movable.

The video processing apparatus as constructed above will work by the following operations. In advance, an operator adjusts the camera position by making the adjuster 10 relative to the post 9 planted on the upper end face of the rack 4 to move the camera 1 appropriately in the vertical direction. Having adjusted the camera position, the operator turns on the power supply switch 5 of the printer 3 provided in the center of the rack 4 in order to make the video processing apparatus to begin its operation. First of all, the operator key-inputs the print size of an attesting photograph using the key 6 of the printer 3. In this case, it is possible to set the print size in a millimeter unit in both vertical/horizontal directions.

Figure 2:
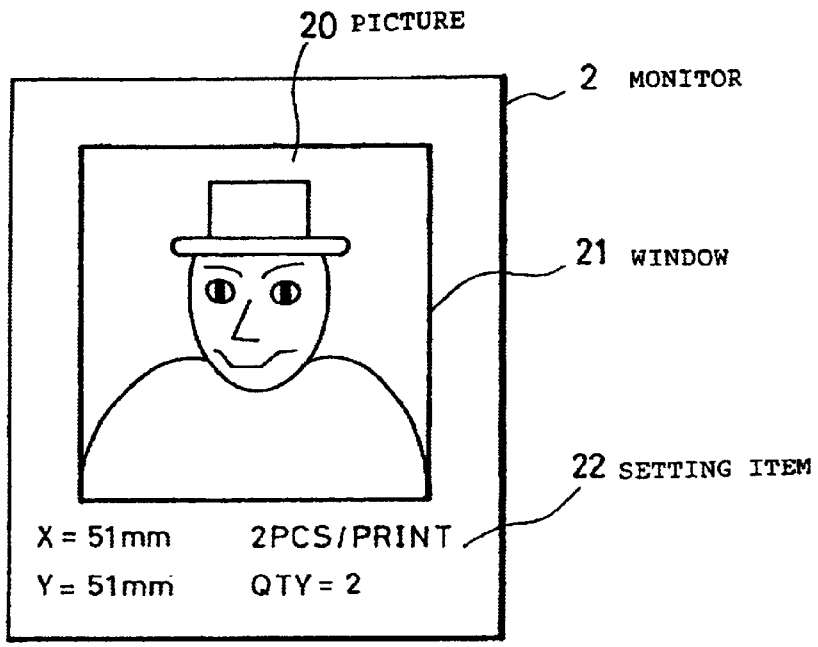
FIG. 2 is a diagram showing a window of a monitor output of the video processing according to the embodiment of the present invention.

Then, the camera 1 images an object to supply its picture data of RGB to the monitor 2. The monitor 2 displays the picture of the object based on the picture data. Here, as shown in FIG. 2, the monitor 2 displays a picture 20, a window 21 indicating a preset print size, and setting items 22. In the setting items 22, X=51 mm indicates a horizontal length of the picture 20 to be printed, Y=51 mm indicates a vertical length, thereof 2PCS/PRINT indicates that two pieces of picture can be taken from one sheet of print pater, and QTY=2 indicates to print two sheets in total. Accordingly, if three pieces of print are desired, it is enough to print two sheets. The operator confirms whether or not the picture 20 is displayed in a proper condition within the frame of the window 21 while viewing the monitor 2. In this case, if the picture size is not appropriate relative to the set window 21, a controller though not shown adjusts, the zoom function of the camera 1 for changing it into an appropriate picture size. Also, the operator may change the picture size manually.

In this way, the monitor 2 displays the picture 20 of the appropriate size within the window 21 of the preset print size. Then, the operator handles the key 6 of the printer 3 for causing the printer 3 to carry out a printing operation, thereby allowing the print output to be obtained from the outlet 8. Therefore, as is indicated by the setting items 22 in FIG. 2, two pictures are printed on one sheet of print paper, so that the print output becomes two pieces.

Next, referring to FIG. 1, an internal configuration of the video processing apparatus described above will be explained. In FIG. 1, the video processing apparatus comprises the camera 1 for outputting the picture data of RGB, A/D converters 31R, 31G, 31B for converting the picture data of RGB into digital picture data, a memory 32 comprised of a DRAM (Dynamic Random Access Memory) for storing four frames of the digital picture data per RGB, a memory controller 33 for controlling read/write of the digital picture data with respect to the memory 32, a memory CPU 34 for supplying a control signal to the memory controller 33 to control its operation, a color pallet 36 for monitor for color-correcting the digital picture data read out of the memory 32 for the monitor display, a D/A converter 37 for converting the color-corrected digital picture data into analogue picture data, a character mixer circuit 38 for mixing the analogue picture data with characters of a menu display and the setting items, or the like and the monitor 2 for displaying both the picture and the characters on the basis of the analogue picture data mixed with the characters.

Here, the camera 1 has a zoom function 2 forming a picture size changing means 3. The memory controller 33 has a horizontal and vertical cutting means 39 for supplying a cut signal to the D/A converter 37 to make an output of the D/A converter 37 active or negative, thereby causing a window to be displayed on the monitor 2. The monitor 2 includes a window display means 40.

In addition, the video processing apparatus comprises a color pallet 41 for printer which color-corrects the digital picture data read out of the memory 32 for the printer display, a color generator circuit 42 which generates the digital picture data of three colors of Y (yellow), M (magenta), and C (cyan) by applying a signal conversion such as the gamma conversion or the like to the color-corrected digital picture data, and the printer 3 of the thermal transfer system of the sublimation type. The printer 3 includes a head controller 43 for generating the print data based on the cut signal form the digital picture data of YMC, a head 44 for sticking a sublimation dye of high sensitivity which is applied to an ink ribbon heated by a thermal element based on the print data to a print paper, a mechanical controller 45 for generating a mechanical driving signal by control data, a platen motor 46 driven to rotate based on the driving signal, and a platen 48 which is rotated by the platen motor 46 to feed the print paper to the head 44 and discharges the paper therefrom and which presses the paper together with the head 44.

Also, the video processing apparatus comprises the key 6 for inputting various setting items and operation specifying items, a system controller 49 for supplying control signals to the camera 1, the monitor 2 and the printer 3 to control their operations, and an interface circuit 50 comprised of an RS-232C for interfacing with the outside. In this connection, the key 6 includes a print size selecting means 51 for selecting the size of a window displayed on the monitor 2 by selecting the window size so as to select the print size of the print output of the printer 3.

The print size selecting means 51 is able to change the horizontal length and the vertical length of the picture in the monitor 2 to an extent that X=16 to 51 mm and Y=16 to 70 mm in a unit of several pixels. The window size change by the key 6 may be performed by inputting a numerical values for X and Y directly, or by displaying the numerical value in the display portion with an upkey or a downkey. Further, it may be arranged that a memory is provided inside the print size selecting means 51 so that the print size of the attesting photograph of the passport in every country is made to be stored in the memory, thereby causing the various print sizes to be incremented in the display portion every time the key 6 is depressed.

If an operator visually determines that the size of the picture displayed on the monitor 2 is not appropriate relative to the size of the window, the operator adjusts the zoom function 30 and thereby changes the picture size into the appropriate one by enlarging reducing the picture size. In this case, the decision of the picture size is performed on the basis of a decision criterion that a face including the upper half body should range from a half to two thirds relative to the size required by the attesting photograph and also on the basis of the picture data.

Here, the camera 1 constitutes the imaging means for imaging an object through an optical system to convert the image into an electrical signal for outputting it as picture data. The memory 32 constitutes the storage means for storing the picture data. The monitor 2 constitutes the display means for displaying the picture of the picture data stored in the storage means within the window as the predetermined picture frame. The printer 3 constitutes the printer means for printing the picture within the picture frame of the picture data stored in the storage means. The key 6 includes the print sizes selecting means 51. The zooming function 30 of the camera 1 is arranges so as to be able to change the picture size by adjusting the optical system.

Moreover, the picture frame in the monitor 2 as the display means is the window of a quadrilateral in which vertical and horizontal frames are symmetrical relative to a display area of the display means, and the display means includes the window display means 40. An operation of the video processing apparatus configured in this way will be explained. First of all, a basic operation will be described. The RGB picture data output from the camera 1 are supplied to the A/D) converters 31R, 31G and 31B. The A/D converters 31R, 31G and 31B convert the analogue picture data into the digital picture data for subsequent processing and supply them to the memory controller 33. The memory controller 33 processes them so that the digital picture data for four frames of the picture may be stored in the memory 32. This operation is referred to as capture. The number of sampling dots obtained when the digital video data from the camera 1 are stored (captured) in the memory 32 by the memory controller 33 correspond to the number of sampling dots of the video data read out from the memory 33 by the memory controller 33 and used for printing by the printer 3 in one-to-one correspondence. Next, the memory controller 33 processes so that the digital picture data stored in the memory 32 may be read for the monitor display. This operation is referred to as monitor out. The digital picture data read out are supplied to the color pallet 36 for the monitor. The color pallet 36 for the monitor performs a color-correcting processing of such as a sharpness on the digital picture data for the monitor display. The color-corrected digital picture data are supplied to the D/A converter 37. The D/A converter 37 converts the digital picture data into an analogue picture data for the monitor display. The analogue picture data are supplied to the character mixer circuit 9. The character mixer circuit 38 mixes the analogue picture data with character data for displaying characters of a menu screen or the setting items, etc. from the system controller 49. The analogue picture data mixed with the characters are supplied to the monitor 2. The monitor 2 displays the picture data.

Also, the memory controller 33 processes the digital picture data stored in the memory 32 to be read for printing out. This operation is referred to as print data outputting. The number of sampling dots obtained when the digital video data from the camera 1 are stored (captured) in the memory 32 by the memory controller 33 correspond to the number of sampling dots of the video data read out from the memory 33 by the memory controller 33 and used for printing by the printer 3 in one-to-one correspondence. The read digital picture data are supplied to the color pallet 41 for the printer. The color pallet 41 for the printer performs the color-correcting processing for printing out on the digital picture data. The color-corrected digital picture data are supplied to the color generating circuit 42. The color generating circuit 42 converts the data into the print data for printing of YMC by the gamma conversion or other signal conversion. The print data for printing are supplied to the head controller 43 of the printer 3. The head controller 43 PWM modulates parallel print data of every one line into 256 tones in the main scanning direction (direction of horizontal synchronizing signal H). The parallel print data of every one line PWM modulated are supplied to the head 44.

The mechanical controller 45 sets a mechanical forwarding pitch depending on a difference of the picture data from the camera 1, i.e. NTSC system or PAL system under the control of the system controller 49. A driving signal for the mechanical forwarding pitch is supplied to the platen motor 46. The platen motor 46 rotates the platen 48 in the preset mechanical forwarding pitch. Since a rotary position of the platen 27 is detected by a sensor not shown and is fed back to the mechanical controller 45, it is possible to make a correct positioning. Then, if the print paper has been carried to a print position by the rotation of the platen 48, the head 44 presses an ink ribbon and the print pater against the platen 48 for printing. Firstly, Y printing is performed. After Y printing has been completed, the head 44 is caused to be separate from the platen 48, and then the print paper and the ink ribbon are forwarded fast for a head searching. In this way, M printing and C printing are also performed.

Next, an operation of changing the picture size will be described. In such a basic operation, when the operator wishes to set for changing the window size by the print size selecting means 51 of the key 6, the operator uses the print size selecting means 51 of the key 6 to supply the setting signal data to the system controller 49. Specifically, the operator directly input values corresponding to X and Y by using the print size selecting means 51 of the key 6 or display the values on the display unit by using the up key or the down key. Alternatively, a memory for storing a print size of attesting photograph of a passport for each country is provided in the print size selecting means 51, various print sizes displayed on the display unit are incremented every time when the key 6 is pressed, the setting signal used for selecting the print size is supplied to the system controller 49 in response to the number of the press of the key 6.

The system controller 49 generates the setting signal data corresponding to the supplied setting signal and supplies the setting signal data to the CPU 34. The CPU 34 reads out the control data based on the setting signal data from the memory 35 and determines the number of pixels corresponding to the print size based on the calculation of the control data. Specifically, the CPU 334 determines the number of horizontal-direction pixels based on the head density of the printer 3 and determines the number of vertical-direction pixels based on a transmission system of the video data. The CPU 34 calculates the sampling frequency from the pixel number.

How the CPU 34 determines the number of pixels and calculates the sampling frequency will hereinafter be described. Moreover, in the attesting photograph, since the picture is required to be clear and not to forge the original picture, it is arranged that pixels of the video data obtained by image pickup of the camera 1 as described above is in a one-to-one correspondence with the pixels of the printer 3 for the size in which one side ranges, e.g. from 16 [mm] to 50 [mm]. In order to make the pixels of the video data obtained by image pickup of the camera 1 to be in such a one-to-one correspondence with the pixels of the printer 3, the still picture control apparatus according to the present embodiment is arranged particularly so that the mechanical forwarding pitch and the sampling frequency may be established for the exclusive use of the printer 3. At this time, the density of the head element is made approximately 250 [DPI] to 330 [DPI] in consideration of the mechanical forwarding matched to the sampling frequency. In this way, the interpolation of the size, etc. inside the printer 23 may not be needed.

Figure 4:
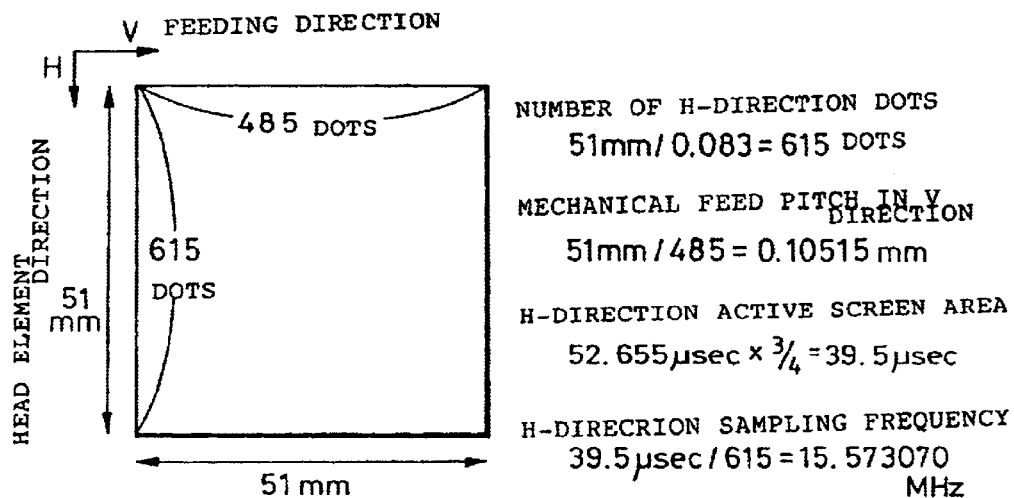
FIG. 4 is a diagram showing a print paper feed pitch and a sampling frequency of the video processing according to the embodiment of the present invention.

An example of calculating the mechanical forwarding pitch and the sampling frequency in a case where the density of the head element is about 305 [DPI] will be shown below. As indicated in FIG. 4, in case of USA passport size, for video signal of NTSC system, since the length of the picture in the forwarding direction X=51 [mm] corresponds to 485 dots of pixel and the length of the picture in the direction of the head element Y=51 [mm] corresponds to 615 dots of pixel, the number of dots in H (horizontal image period, or head element) direction is equal to 51 [mm]/0.083=615 dots, because the head density per one inch is 2.54/305=0.083. The mechanical forwarding pitch in V (vertical image period, or forwarding) direction is equal to 51 [mm]/485 dots=0.10515 [mm].

Further, since the effective screen area in H (head element) direction equals 52.655 [$\mu$sec]×¾=39.5 [$\mu$sec], the sampling frequency in H (head element) direction is found to be 39.5 [$\mu$sec]/615=15.573070 [MHz]. This sampling frequency serves as the frequency for acquiring the picture into the window.

The CPU 34 supplies the setting signal for the above number of pixels and the sampling frequency to the memory controller 333. The memory controller 33 processes the video data based on the number of pixels determined by the CPU 34 so that the pixels of the video data output from the camera 1 should be in one-to-one correspondence with the pixels of the video data to be printed by the printer 3. Based on the above sampling frequency, the memory controller 33 samples pixels of the video data output from the camera 1 and the pixels of the video data to be printed by the printer 3 by using the same sampling frequency.

The horizontal and vertical cutting means 39 of the memory controller 33 cuts the picture of the video data in the horizontal or vertical direction in accordance with the number of pixels determined by the CPU 34, thereby generating a window corresponding to the above number of pixels on the monitor 2. The horizontal and vertical cutting means 39 of the memory controller 33 cuts the picture of the video data in the horizontal or vertical direction in accordance with the number of pixels determined by the CPU 34, thereby permits the printer 3 to print a picture corresponding to the above number of pixels.

Specifically, the horizontal and vertical cutting means 39 of the memory controller 33 generates a cut signal BLNK used for cutting an image having the above number of pixels based on the setting signal supplied thereto from the CPU 34, and supplies the cut signal BLNK to the D/A converter 37 at the preceding stage of the monitor 2 and the head controller 43 of the printer 3. The D/A converter 37 outputs an analog video data obtained after D/A conversion when the cut signal BLNK is active, and does not output the analog video data obtained after D/A conversion when the cut signal BLNK is negative. Thus, the window based on the cut signal is displayed on the monitor 2. An image is displayed inside the window. The pixels of the video data displayed on the monitor 2 are decimated in a predetermined ratio relative to the pixels of the video data obtained by the image pickup of the camera 1, e.g., resolution of the monitor. The image displayed on the monitor 2 is used only for confirming whether or not the image is located within the window set in accordance with the print size.

The head controller 43 prints the video data when the cut signal BLNK is active and does not print the video data when the cut signal BLNK is negative. Thus, the head controller 43 recognizes the print range of the picture based on the cut signal. If the operator presses the key 6 to designate the print-out operation, then the horizontal and vertical cut signals BLNK are supplied from the memory controller 33 to the head controller 43 of the printer 33 and hence only the print data formed of pixels of the video data corresponding to the pixels of the video data obtained by the image pickup of the camera 1 in one-to-one correspondence is supplied to the head 44. Thus, it is possible to print the picture of a proper size by selecting a print size by the print size selecting means 51 without forging the video data obtained by the image pickup of the camera 1.

If the operator visually determines that the size of the picture displayed on the monitor 2 is not appropriate relative to the size of the window, the operator adjusts the zoom function 30 and thereby changes the picture size into the appropriate one by enlarging reducing the picture size. THe picture of the proper size obtained after change of the picture size is printed. In this case, the decision of the picture size is performed on the basis of a decision criterion that a face including the upper half body should range from a half to two thirds relative to the size required by the attesting photograph and also on the basis of the picture data.

In the video processing apparatus according to this embodiment, when the operator visually determines that the picture size displayed on the monitor 2 is not appropriate relative to the size of the window, the operator adjusts the zooming function 30 of the camera 1 to thereby change the picture size to the proper picture size by enlarging or reducing the picture in size. However, a picture size determining means is provided in the system controller 49 to automatically determine and change the picture size.

At this time, the system controller 49 recognizes the setting signal data from the print size selecting means 51, which is the original data to produce the window. The system controller 49 also recognizes the analogue picture data displayed on the monitor 2. Then, the picture size deciding means of the system controller 49 supplies the picture size changing signal to the zoom function 30 of the camera 1, which signal is to make the picture size smaller or larger as the size of the picture displayed on the monitor 2 is much larger or much smaller than the size of the window. The zoom function 30 is adjusted by causing the predetermined driving mechanism to work for changing the picture size. Thus, the picture of the size which is proper relative to the window specifying the print size is displayed on the monitor 2.

Figure 5:
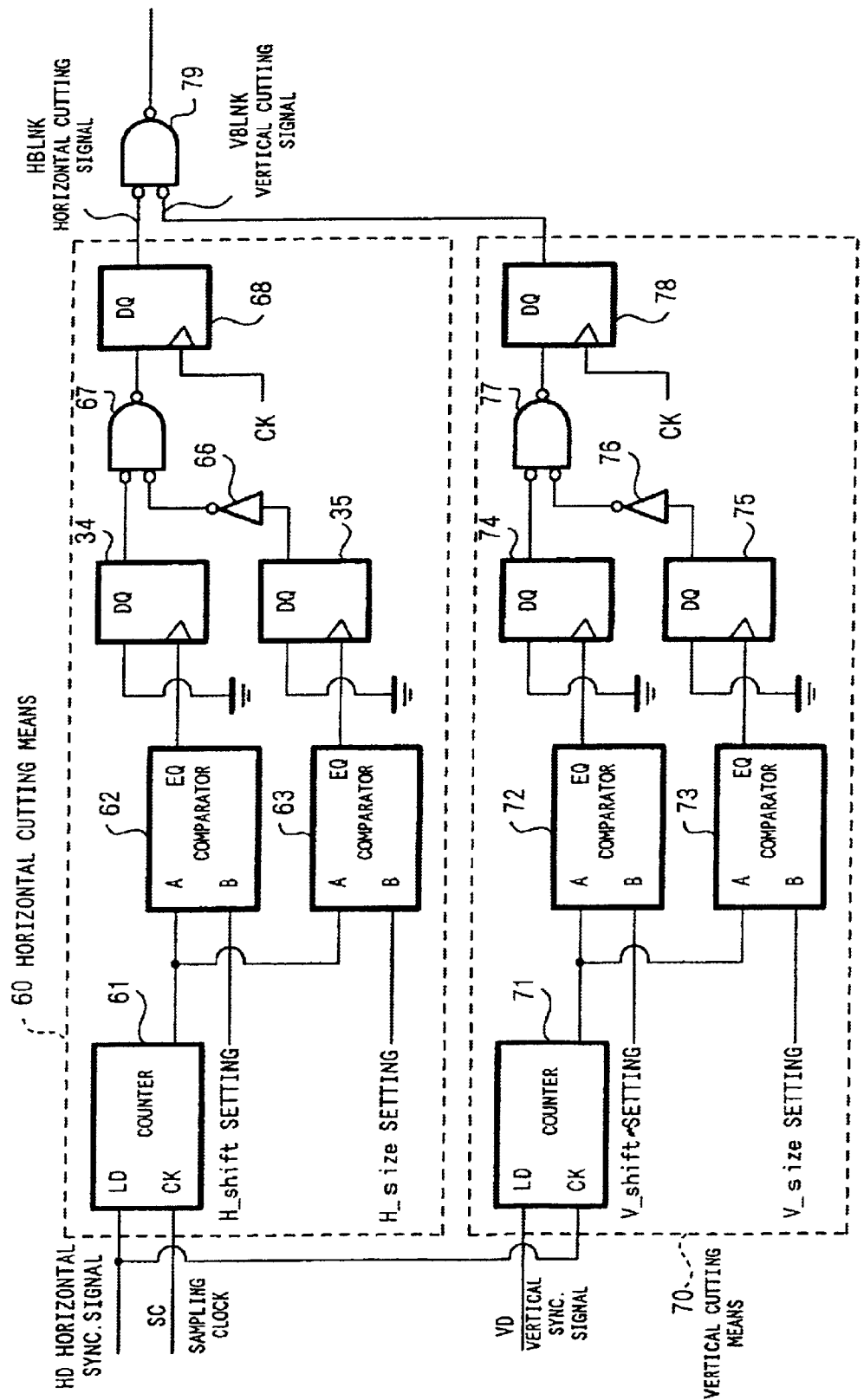
FIG. 5 is a diagram showing a cut signal cutting circuit in a memory controller of the video processing according to the embodiment of the present invention.

Again, the horizontal and vertical cutting means 39 inside the memory controller 33 shown in FIG. 1 is, more particularly, comprised of, for example, a cut signal generator circuit as shown in FIG. 5. Referring to FIG. 5, the cut signal generator circuit includes a horizontal cutting means 60 for producing a cut signal in the horizontal synchronizing signal HD direction, a vertical cutting means 70 for producing a cut signal in the vertical synchronizing signal VD direction, and a first NAND circuit 79 of two input negative logic for outputting a horizontal cut signal HBLNK or a vertical cut signal VBLNK.

The horizontal cutting means 60 includes a first counter 61 for loading the horizontal synchronizing signal HD to count it with a sampling clock SC, a first comparator 62 for comparing an output of the counter 61 with a horizontal shift signal H-shift, a second comparator 63 for comparing the output of the counter 61 with a horizontal size signal H-size, a first D flip-flop 64 for latching an output of the first comparator 62, a second D flip-flop 65 for latching an output of the second comparator 63, an invertor 66 for inverting an output of the second D flip-flop 65, a second NAND circuit 67 of two input negative logic which outputs an active low signal if both the output of the first D flip-flop 64 and the output of the invertor 66 are of low level, and a third D flip-flop 38 for latching the output of the second NAND circuit 67 to output it with a clock CK as the horizontal cut signal HBLNK.

Also, the vertical cutting means 70 includes a second counter 71 for lading the vertical synchronizing signal VD to count it with the sampling clock SC, a third comparator 72 for comparing an output of the counter 71 with a vertical shift signal V_shift, a fourth comparator 73 for comparing an output of the counter 71 with a vertical size signal V_size, a fourth D flip-flop 74 for latching an output of the third comparator 72, a fifth D flip-flop 75 for latching an output of the fourth comparator 73, an invertor 76 for inverting an output of the fifth D flip-flop 75, a third NAND circuit 77 of two input negative logic which outputs an active low signal if both the output of the fourth D flip-flop 74 and the output of the invertor 76 are of low level, and a sixth D flip-flop 48 for latching the output of the third NAND circuit 77 to output it with the clock CK as the vertical squaring signal VBLNK.

An operation of the cut signal generator circuit arranged in this way will be explained with reference to time charts of FIG. 3 and FIG. 4. First of all, an operation of the horizontal cutting means 30 will be described. In A of FIG. 3, when the horizontal synchronizing signal HD falls to a low level, the first counter 61 shown in FIG. 2 begins to count the sampling click SC shown in FIG. 6B from that falling edge and then the count output is supplied to an input terminal A of the first comparator 62. The H shift setting signal preset by the print size selecting means 51 shown in FIG. 1 is supplied to an input terminal B of the first comparator. In the first comparator 62, when the count output coincides with the H shift setting signal, an output signal is output from an output terminal EQ. This output signal is supplied to a clock terminal of the first D flip-flop 64. Since an input terminal D of the first D flip-flop 64 is supplied with an earth potential of a low level, an output of the low level is output from a output terminal Q according to the clock. Then, the horizontal shift signal H shift shown in FIG. 6C is output from the first D flip-flop 64. As shown in FIG. 6C, the horizontal shift signal H shift falls from a high level to a low level when the H shift setting signal coincides with a value of the first counter 61, and is reset from the low level to the high level when the horizontal synchronizing signal HD falls to the low level.

Again, the count output of the first counter 61 is supplied to an input terminal A of the second comparator 63. The H size setting signal preset by the print size selecting means 51 shown in FIG. 1 is supplied to an input terminal B of the second comparator. In the second comparator 63, when the count output coincides with the H size setting signal, an output signal is output from the output terminal EQ. This output signal is supplied to a clock terminal of the second D flip-flop 65. Since an input terminal D of the second D flip-flop 65 is supplied with the earth potential of a low level, an output of the low level is output from an output terminal Q according to the clock, which output is inverted by the invertor 66. Then, from the invertor 66 the horizontal size signal H size shown in FIG. 6D is output. As shown in FIG. 6D, the horizontal size signal H size rises from the low level to the high level when the H size setting signal coincides with a value of the first counter 61, and is reset form the high level to the low level when the horizontal synchronizing signal HD falls to the low level.

Since both the horizontal shift signal H shift shown in FIG. 6C which is the output signal of the first D flip-flop 64 and the horizontal size signal H size shown in FIG. 6D which is the output signal of the invertor 66 are supplied to the second NAND circuit 67, from this second NAND circuit 67 an active low output signal is output when both the horizontal shift signal H shift in FIG. 6C and the horizontal size signal H size in FIG. 6D are of the low level. The output signal of the NAND circuit 67 is supplied to the third D flip-flop 38, by which third D flip-flop 38 the signal is latched based on the clock signal CK and is reshaped in wave form. Thereafter, the active low horizontal cut signal HBLNK shown in FIG. 6E will be output.

Next, an operation of the vertical cutting means 70 will described. In FIG. 7A, when the vertical synchronizing signal VD falls to a low level, the second counter 71 shown in FIG. 2 begins to count at that falling edge the horizontal synchronizing signal HD shown in FIG. 7B and then the count output is supplied to an input terminal A of the third comparator 72. The V shift setting signal preset by the print size selecting means 51 shown in FIG. 1 is supplied to an input terminal B of the third comparator. In the third comparator 72, when the count output coincides with the V shift setting signal, an output signal is output from its output terminal EQ. This output signal is supplied to a clock terminal of the fourth D flip-flop 74. Since an input terminal D of the fourth D flip-flop 74 is supplied with the earth potential of the low level, an output of the low level is output from an output terminal Q according to the clock. Then, the vertical shift signal V shift shown in FIG. 7C is output from the fourth D flip-flop 74. As shown in FIG. 7C, the vertical shift signal V shift falls from the high level to the low level when the V shift setting signal coincides with a value of the second counter 71, and is reset from the low level to the high level when the vertical synchronizing signal VD falls to the low level.

Again, the count output of the second counter 71 is supplied to an input terminal A of the fourth comparator 73. The V size setting signal preset by the print size selecting means 51 shown in FIG. 1 is supplied to an input terminal B of the fourth comparator. In the fourth comparator 73, when the count output coincides with the V size setting signal, an output signal is output from the output terminal EQ. This output signal is supplied to a clock terminal of the fifth D flip-flop 75. Since an input terminal D of the fifth D flip-flop 75 is supplied with the earth potential of the low level, an output of the low level is output from an output terminal Q according to the clock, which output is inverted by the invertor 76. Then, from the invertor 76 the vertical size signal V size shown in FIG. 7D is output. As shown in FIG. 7D, the vertical size signal V size rises from the low level to the high level when the V size setting signal coincides with a value of the second counter 71, and is reset from the high level to the low level when the vertical synchronizing signal VD falls to the low level.

Since both the vertical shift signal V shift shown in FIG. 7C which is the output signal of the fourth D flip-flop 74 and the vertical size signal V size shown in FIG. 7D which is the output signal of the invertor 76 are supplied to the third NAND circuit 77, from this third NAND circuit 77 an active low output signal is output when both the vertical shift signal V shift shown in FIG. 7C and the vertical size signal V size shown in FIG. 7D are on the low level. The output signal of the third NAND circuit 77 is latched by the sixth D flip-flop 48 based on the clock signal CK, from which flip-flop 48 the active low vertical cut signal VBLNK shown in FIG. 7E will be output.

At the final stage, both the horizontal cut signal HBLNK from the horizontal cutting means 60 and the vertical cut signal VBLNK from the vertical cutting means 70 are supplied to the first NAND circuit 79. Therefore, from the first NAND circuit 79, both the active low horizontal cut signal HBLNK and the active low vertical cut signal VBLNK will be output.

Figure 8:
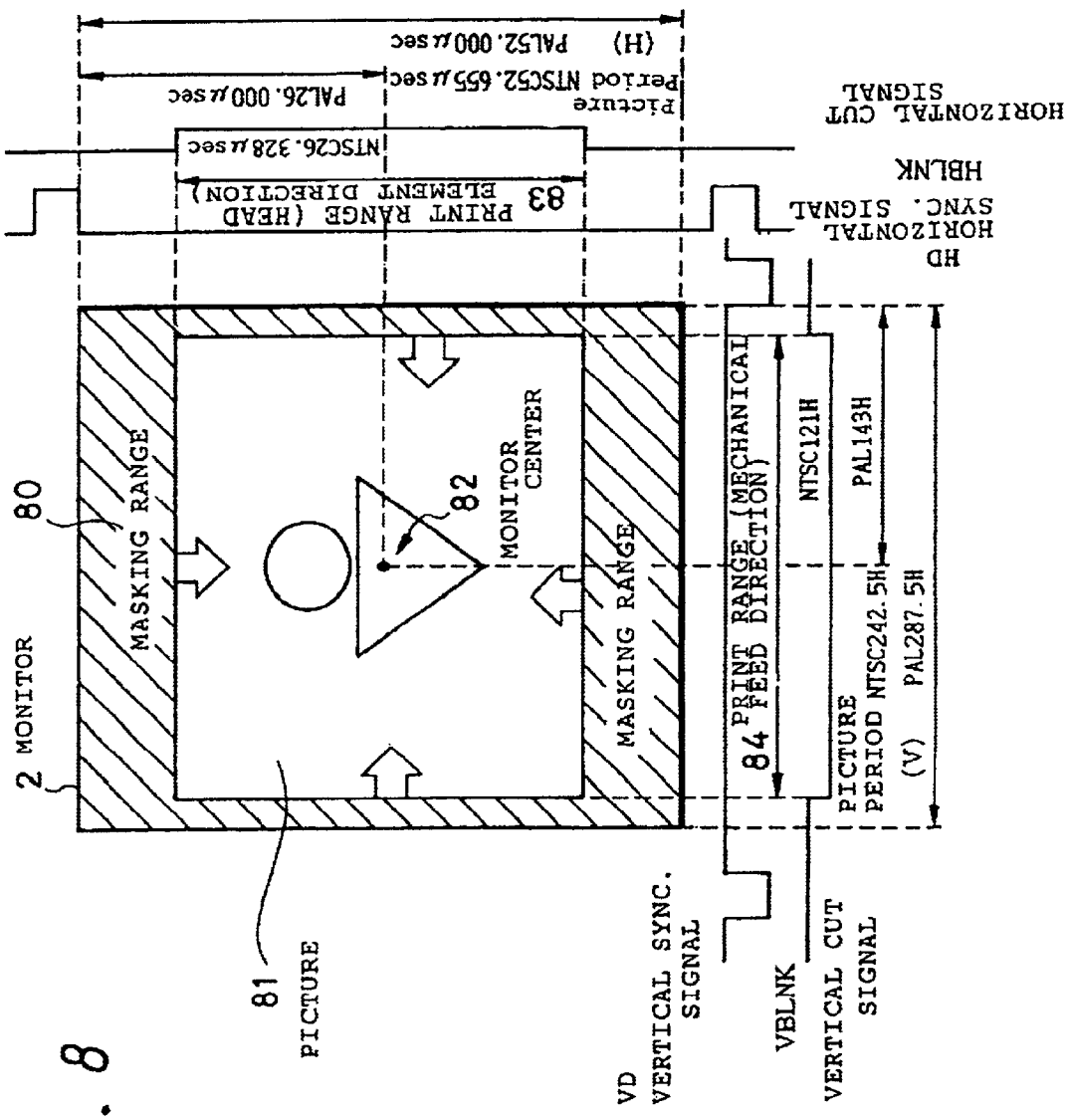
FIG. 8 is a diagram showing a cutting operation of the video processing according to the embodiment of the present invention.

Next, referring to FIG. 8, the quarrying operation carried out by the horizontal cut signal HBLNK and the vertical cut signal VBLNK will be described. In FIG. 8, a mask area 80 indicated by oblique lines from an end portion of the monitor 2 to a center thereof 82 is established, where the back of particular color (e.g. blue) is displayed. A picture 81 of an object is displayed in the middle portion of the screen, whose picture size is altered. In other words, the horizontal cut signal HBLNK produced based on the horizontal synchronizing signal HD is supplied to the D/A converter 37 at the previous stage of the monitor 2. Then, the horizontal cut signal HBLNK makes the output of the D/A converter 37 active or negative, so that the window will be displayed on the monitor 2.

In the vertical direction of the monitor 2, an area where the horizontal cut signal HBLNK is of the high level, of the image period in the horizontal direction (H, 52.655 [$\mu$sec] for NTSC system, 52.000 [$\mu$sec] for PAL system. From the center 52 to the end portion of the monitor: 26.328 [$\mu$sec] for NTSC system, 26.000 [$\mu$sec] for PAL system) will form the masking area 50. An area where the horizontal cut signal HBLNK is of the low level will form a display area where the picture 51 with the altered size will be displayed.

Also, in the horizontal direction of the monitor 2, an area where the vertical cut signal VBNK is of the high level, of the image period in the vertical direction (V, 242.5 H for NTSC system, 287.5 H for PAL system. From the center 52 to the end portion of the monitor: 121 H for NTSC system, 143 H for PAL system) will form the masking area 80. An area where the vertical cut signal VBLNK of on the low level will form a display area where the picture 51 with the altered size is displayed.

In this case, the display are of the picture 81 with the altered size where the horizontal cut signal HBLNK is of the low level in the vertical direction of the monitor 2 corresponds to a print area 53 of the printer 3. This vertical direction becomes the direction of a head element, namely the main scanning direction. Also, the display area of the picture 81 with the altered size where the vertical cut signal VBLNK is of the low level in the horizontal direction of the monitor 2 corresponds to a print area 84 of the printer 3. This horizontal direction becomes the mechanical forwarding direction, namely the sub-scanning direction.

In this way, the display area whose size is varied is displayed on the monitor 2 as shown in FIG. 2. In FIG. 2, an area surrounded by the window 21 of a thick solid line on the monitor 2 forms the display area of the picture 20 according to the varied size. A size of the window 21 can be preset on the basis of above horizontal cut signal HBLNK and vertical cut signal VBLNK. Depending on the preset size of the window 21, the picture within the display area is adjusted to that of the proper size through the zoom function 30 of the camera 1. In the setting item 22 in underpart of the monitor 2, there are displayed the horizontal and vertical sizes of the display area in the monitor 2 due to the window 21:X=51 [mm] and Y=51 [mm], the number of pieces in which the picture of this size is printed on one sheet of print paper:2PCS/PRINT, and the number of whole print papers for printing:QTY=2.

In the video processing apparatus according to the this embodiment, since the pixels of the picture data printed by the printer 3 are made to be in the one to one correspondence with the pixels of the picture data displayed in the window 21 on the monitor 2, it is possible to obtain the printed picture in which the original picture is reflected as it is, without forging the picture data.

Furthermore, due to the requirement of the attesting photograph described above, it is arranged that the picture having the size fitted to the print size of the printer 3 is displayed on the monitor 2. The pixels of the video data displayed on the monitor 2 are decimated in a predetermined ratio relative to the pixels of the video data to be printed by the printer 3. In other words, the monitor 2 indicates what size of the print will be issued by the printer 3 from the current picture displayed on the monitor 2. Accordingly, it is arranged that if the print size is altered, then the size of the picture displayed on the monitor 2 is correspondingly altered. In face, the picture size printed by the printer 3 differs from the picture size displayed on the monitor 2, but it is arranged that the both sizes are in a proportional relationship.

Thus, according to this embodiment, as described above, an arbitrary print size can be selected, thereby allowing any size of print to be obtained irrespective of conditions of the video signal and unique mechanical conditions of the printer 3. In this case, when the attesting photograph of passport is desired, the print size can be preset for the passport. When the attesting photograph of driving license is desired, the print size can be preset for the driving license. In this way, it is possible to obtain the appropriate size of picture depending on the preset print size.

Furthermore, the video processing apparatus according to the present embodiment is able to cope with various attesting photographs that are different in each country all over the world. Particularly, by storing, in advance, an operation software based on preset values of multiple print sizes corresponding to the attesting photograph of each country in the system controller 49, and reading out the stored contents through an easy operation to enable the various sizes to be selected, it is possible to cope with the attesting photograph of each country.

The video processing apparatus according to this embodiment includes the camera 1 as an imaging means for imaging an object through the optical system to obtain an electric signal through conversion and outputting the signal as the video data, the monitor 2 as a display means for displaying a picture of the video data in a predetermined picture frame, the printer 3 as a printing means for printing the picture in the picture frame of the video data, the print size selecting means 51 for selecting a print size of the picture to be printed by the printing means, the CPU 43 as a pixel-number determining means for determining the number of pixels of the video data corresponding to the print size selected by the print size selecting means 51, and the memory controller 33 as a video data processing means for processing the video data based on the number of pixels determined by the above pixel-number determining means so that the pixels of the video data output from the imaging means should be in one-to-one correspondence with the pixels of the video data printed by the printing means. Therefore, since the size of the picture frame is selected regardless of conditions of the printing means and so on and thereby the picture size is selected with confirmation of the picture range using the display means to thereby prevent the original picture from being subjected to the video processing such as the decimating processing, the interpolation processing or the like, it is possible to obtain a printed picture having an optional size without forging the video data as requested by the attesting photograph.

Since in the video processing apparatus according to this embodiment the CPU 34 as the pixel-number determining means determines the number of horizontal-direction pixels based on the head density of the printing means, it is possible to obtain the printed picture having the size of the optional number of horizontal-direction pixels without forging the original video data.

Since in the video processing apparatus according to this embodiment the CPU 34 as the pixel-number determining means determines the number of vertical-direction pixels based on the transmission system of the video data, it is possible to obtain the printed picture having the size of the optional number of vertical-direction pixels without forging the original video data.

Since the video processing apparatus according to this embodiment is provided with the horizontal and vertical cutting means 39 for cutting the picture of the video data in the horizontal direction or the vertical direction based on the number of pixels determined by the CPU 34 as the pixel-number determining means to thereby generate the picture frame corresponding to the above number of pixels on the monitor 2 as the display means, it is possible to confirm the printing range corresponding to the number of pixels on the displaying means.

Since the video processing apparatus according to this embodiment is provided with the horizontal and vertical cutting means 39 for cutting the picture of the video data in the horizontal direction or the vertical direction based on the number of pixels determined by the CPU 34 as the pixel-number determining means to thereby print the picture corresponding to the number of pixels in the printer 3 as the printing means, it is possible to permit the printing means to print the picture corresponding to the number of pixels.

Since in the video processing apparatus according to this embodiment the memory controller 33 as the video processing means uses the same sampling frequency for sampling the pixels of the video data output from the camera 1 as the imaging means and sampling the pixels of the video data to be printed by the printer 3 as the printing means, it is possible to sample the pixels of the video data so that the pixels of the video data output from the imaging means should reliably be in one-to-one correspondence with the pixels of the video data to be printed by the printing means.

Since the video processing apparatus according to this embodiment decimates the pixels of the video data displayed on the monitor 2 as the display means in a predetermined ratio relative to the video data obtained by the image pickup of the camera 1 as the imaging means, it is possible to use the display means having lower resolution as compared with that of the printer 3 as the printing means, only for use in confirmation of the printing range of the picture.

Since in the video processing apparatus according to this embodiment the print size selecting means 51 directly sets values by input using the key, it is possible to set the print size based on the values directly selected and set by the operator.

Since in the video processing apparatus according to this embodiment the print size selecting means 51 selects one from a plurality of preset values, it is possible to set the print size based on the selectively set values indicative of a specific size or the like.

Since in the video processing apparatus according to this embodiment the camera 1 as the imaging means has the zooming function 30 for adjusting the zooming operation of the optical system, it is not necessary to subject the original picture to the video processing such as the decimating processing, the interpolation processing or the like. Therefore, it is possible to change the picture size by optically enlarging and reducing the original picture in size without forging the video data as required by the attesting photograph.

While in this embodiment the video data is masked by the window based on the cut signal BLNK, a window memory for storing only the video data in the window provided based on the cut signal BLNK may be provided to display the video data of the window memory on the monitor 2 and to print the same by the printer 3.

The following effects can be achieved by the present invention.

The video processing apparatus according to the present invention includes the imaging means for imaging an object through the optical system to obtain an electric signal through conversion and outputting the signal as the video data, the display means for displaying a picture of the video data in a predetermined picture frame, the printing means for printing the picture in the picture frame of the video data, the print size selecting means for selecting a print size of the picture to be printed by the printing means, the pixel-number determining means for determining the number of pixels of the video data corresponding to the print size selected by the print size selecting means, and the video data processing means for processing the video data based on the number of pixels determined by the above pixel-number determining means so that the pixels of the video data output from the imaging means should be in one-to-one correspondence with the pixels of the video data printed by the printing means. Therefore, since, the size of the picture frame is selected regardless of conditions of the printing means and so on and thereby the picture size is selected with confirmation of the picture range using the display means to thereby prevent the original picture from being subjected to the video processing such as the decimating processing, the interpolation processing or the like, it is possible to obtain a printed picture having an optional size without forging the video data as requested by the attesting photograph. Since in the video processing apparatus according to the present invention the pixel-number determining means determines the number of horizontal-direction pixels based on the head density of the printing means, it is possible to obtain the printed picture having the size of the optional number of horizontal-direction pixels without forging the original video data.

Since in the video processing apparatus according to the present invention the pixel-number determining means determines the number of vertical-direction pixels based on the transmission system of the video data, it is possible to obtain the printed picture having the size of the optional number of vertical-direction pixels without forging the original video data.

Since the video processing apparatus according to the present invention is provided with the horizontal and vertical cutting means 39 for cutting the picture of the video data in the horizontal direction or the vertical direction based on the number of pixels determined by the pixel-number determining means to thereby generate the picture frame corresponding to the above number of pixels on the monitor 2 as the display means, it is possible to confirm the printing range corresponding to the number of pixels on the displaying means.

Since the video processing apparatus according to the present invention is provided with the horizontal and vertical cutting means for cutting the picture of the video data in the horizontal direction or the vertical direction based on the number of pixels determined by the pixel-number determining means to thereby print the picture corresponding to the number of pixels in the printing means, it is possible to permit the printing means to print the picture corresponding to the number of pixels.

Since in the video processing apparatus according to the present invention the video processing means uses the same sampling frequency for sampling the pixels of the video data output from the imaging means and sampling the pixels of the video data to be printed by the printing means, it is possible to sample the pixels of the video data so that the pixels of the video data output from the imaging means should reliably be in one-to-one correspondence with the pixels of the video data to be printed by the printing means.

Since the video processing apparatus according to the present invention decimates the pixels of the video data displayed on the display means in a predetermined ratio relative to the video data obtained by the image pickup of the imaging means, it is possible to use the display means having lower resolution as compared with that of the printing means, only for use in confirmation of the printing range of the picture.

Since in the video processing apparatus according to the present invention the print size selecting means directly sets values by input using the key, it is possible to set the print size based on the values directly selected and set by the operator.

Since in the video processing apparatus according to the present invention the print size selecting means selects one from a plurality of preset values, it is possible to set the print size based on the selectively set values indicative of a specific size or the like.

Since in the video processing apparatus according to the present invention the imaging means has the zooming function for adjusting the zooming operation of the optical system, it is not necessary to subject the original picture to the video processing such as the decimating processing, the interpolation processing or the like. Therefore, it is possible to change the picture size by optically enlarging and reducing the original picture in size without forging the video data as required by the attesting photograph.

The printing apparatus according to the present invention is a printing apparatus for printing an image based on a source video data on a printing paper, and includes a storage means for storing said source video data, a reading means for reading a video image stored in the storage means, a printing means for printing the images based on the video data read out by the above reading means on the printing paper, and a control means for controlling the reading means and the printing means so that the pixels of the source video data should be in one-to-one correspondence with the pixels of the video data to be printed on the printing paper. Therefore, there can be achieved an effect in which the printed picture having an arbitrary size can be obtained without forging the original video data.

Since the printing apparatus according to the present invention includes the head drive means for driving the head for printing the above read-out video data on the printing paper and the paper feeding means for mechanically conveying the printing paper relative to the head, there can be achieved an effect in which the picture having the horizontal and vertical direction sizes corresponding to the pixels of the video data can be printed by the head drive means and the paper feeding means.

Since in the printing apparatus according to the present invention the controlling means controls the read sampling frequency of the reading means and the paper feed pitch in response to the head density of the head, there can be achieved an effect in which the picture having the vertical direction size corresponding to the pixels of the video data can be printed.

Since the printing apparatus according to the present invention further includes the print size selecting means for selecting the print size of the image to be printed on the printing paper and the above controlling means controls the read sampling frequency of the reading means and the paper feed pitch in response to the print size selected by the print size selecting means, there can be achieved an effect in which the picture having the horizontal- and vertical-direction size corresponding to the print size can be printed.

Since the printing apparatus according to the present invention further includes the print size selecting means for selecting the print size of the image to be printed on the printing paper and the above controlling means determines, in response to the print size selected by the print size selecting means, the number of pixels of the video data to be printed on the printing paper and controls the read sampling frequency of the reading means and the paper feed pitch in response to the determined number of pixels and the head density of the head, there can be achieved an effect in which the picture having the horizontal- and vertical-direction size in response to the horizontal-direction pixels of the video data corresponding to the print size can be printed.

Since the printing apparatus according to the present invention further includes the print size selecting means for selecting the print size of the image to be printed on the printing paper and the above controlling means determines, in response to the print size selected by the print size selecting means and to the transmission system of the source video data, the number of pixels of the video data to be printed on the printing paper and controls the read sampling frequency of the reading means and the paper feed pitch in response to the determined number of pixels and the head density of the head, there can be achieved an effect in which the picture having the horizontal- and vertical-direction size in response to the horizontal-direction pixels of the video data corresponding to the print size can be printed.

A video processing apparatus according to a second embodiment of the present invention will hereinafter be described.

The video processing apparatus according to this embodiment is to be utilized for taking the attesting photograph such as IVP (instant video portrait) in a no man's photobooth or a studio. Particularly, in the field of the attesting photograph, the size of the attesting photograph of, for example, the passport is often required to be the vertically elongated size. Therefore, the video camera is usually positioned to be rotated by 90° so that the picture rotated by 90° may be photographed. Subsequently, the monitor is positioned to be rotated backward by 90°, for causing the monitor to display a vertically elongated picture. However, since the on-screen display for controlling the printer is displayed in the scanning line direction, that is, the vertical direction of the monitor, it is hard for the operator to read the on-screen display. Therefore, the present embodiment is arranged so that the printing operation of the attesting photograph of the passport in every country may easily performed by preparing the 90°-rotation font against a normal font to provide a function for causing the vertically elongated monitor to display the on-screen display in the horizontal direction.

A monitor 2 displays the picture together with the on-screen display which indicates a message text and setting control items for the printing operation. At this time, the on-screen display displayed on the monitor 2 is displayed in the horizontal direction of the monitor. In this way, it is arranged that the on-screen display is make easy to be read even in the case of the vertically elongated monitor 2.

The video processing apparatus as constructed above will work by the following operations. First of all, the operator selects the menu screen of the on-screen display displayed on the monitor 2 to input the print size of the attesting photograph by using the key 6 of the printer 3. In this case, it is possible to set up the print size in a millimeter unit in both vertical/horizontal directions. As shown in FIG. 9, in the menu screen for setting the print size (WINDOW SETUP), it is possible to setup the print size between 16 and 51 mm in the vertical (H) and horizontal (V) direction of the monitor 8, respectively. In this regard, for example, the operator sets up the print size of 51 mm in the respective vertical (H) and horizontal (V) directions, which is the passport size of U.S.A., and also the desired number of piece of three.

Then, the camera 1 images a subject and supplies the picture data of RGB to the monitor 2. The monitor 2 displays the picture of the subject based on that picture data. Here, as shown in FIG. 2, the monitor 2 displays the window 61 indicating the picture 60 and the set-up print size, the menu screen (WINDOW SETUP) for setting up the print size shown in FIG. 9, described above as the on-screen display, and the setting items 63 set up thereby. In this case, both the menu screen (WINDOW SETUP) 62 for setting the print size and the setting items 22 are displayed simultaneously with the picture 20, whereas it may be possible that the menu screen (WINDOW SETUP) for setting the print size and the picture 20 are displayed first, and after the setting has been decided the setting items 22 and the picture 20 are displayed sequentially. In this context, for other examples of the on-screen display, there are a menu display for setting color (COLOR ADJUST), etc. which is important when adjusting flesh color or quality of picture of the subject by print data of the printer YMC, light and shade, sharpness or the like, of the menu display for setting operation of the printer.

The setting items 22 are displayed as follows. X=51 mm indicates a horizontal breadth of the picture 20 printed, Y=51 mm indicates a vertical length of the picture, 2PCS/PRINT indicates that two pieces of picture can be taken from one sheet of print paper and QTY=2 indicates that two pieces are printed in total, respectively. Accordingly, if three pieces of print are desired. It is enough to print two sheets. The operator checks whether or not the setting items 22 set up along the menu screen (WINDOW SETUP) for setting the print size are displayed as he views the monitor 2. In this case, such an operation will be carried out in which the 90°-rotation font rotated by 90° against normal font (not shown) is read out for causing the on-screen display to be displayed on the monitor 2.

Figure 3:
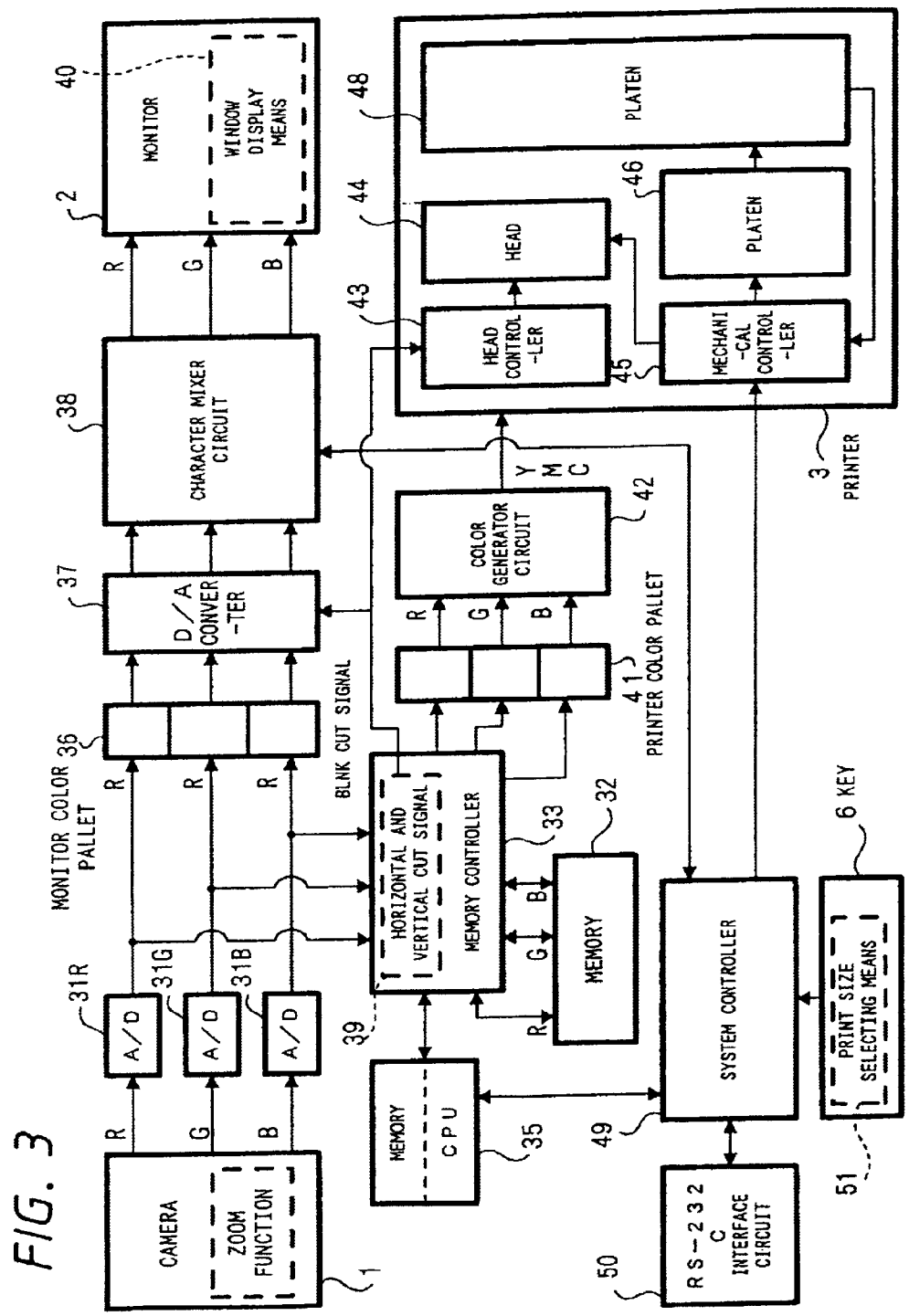
FIG. 3 is a block diagram showing an arrangement of the video processing according to the embodiment of the present invention.

As shown in FIG. 3, the video processing apparatus according to this embodiment has the following arrangement. The key 6 includes a key controller, not shown, for generating a control signal to control the on-screen display by the 90°-rotated font.

In order to generate a control signal for selecting between the on-screen displays by the normal font or the 90°-rotation font in the key 6, two respective keys for selecting between the on-screen displays by the normal font or the 90°-rotation font may be provided in the key 6. Alternatively, it may be possible to select between the on-screen displays by the normal font or the 90°-rotation font by continuously pressing a single key in the key 6, or the selected state may be displayed in the display unit 7 by a incrementing manner. Further, it is possible to input by the key 6, for example, the various setting items of he picture data, etc. in the size setting menu of the on-screen display for setting the print size by the printer 3.

Figure 10:
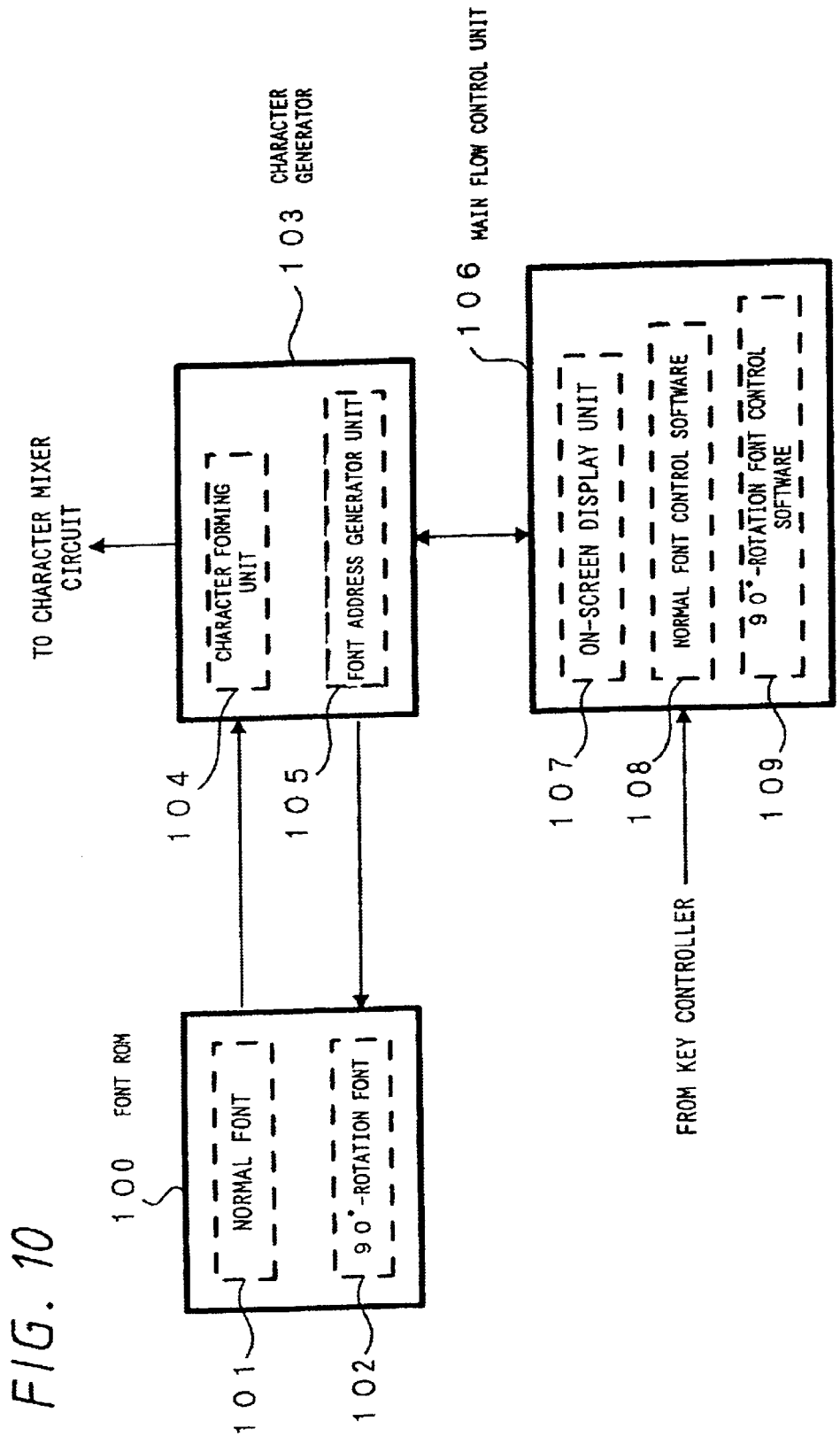
FIG. 10 is a block diagram showing an arrangement of a system controller of the video processing according to the embodiment of the present invention.

As shown in FIG. 10 described later on, the system controller 49 includes a font ROM 100 for storing the 90°-rotation font, a character generator 103 for generating the characters by reading the 90°-rotation font, and a main flow controller unit 106 for performing a main flow chart which controls an operation for the on-screen display of the font ROM 100 and the character generator 103 based on the control signal from the key controller.

Here, the camera 1 constitutes the imaging means for imaging a subject through the optical system to convert the image into an electrical signal for outputting it as picture data. The memory 32 constitutes the storage means for storing the picture data. The system controller 49 constitutes the character data generator means for generating the character data connected with the picture data control. The monitor 2 constitutes the display means for displaying the picture of the picture data stored in the memory 32 and the characters of the character data generated by the system controller 12. The printer 3 constitutes the printer means for printing the picture displayed on the monitor 2 based on the character data. Further, the system controller 49 has a junction which rotates the characters against the picture when the picture and the characters are displayed on the monitor 2. particularly, the system controller 49 has the function which rotates the characters against the picture by 90° in a predetermined direction, when the image of the subject is rotated by 90° in a predetermined direction by the camera 1 and the display of the picture and the characters in the monitor 2 is rotated by 90° in the opposite direction to the predetermined direction.

Next, an operation of the on-screen display performed by the 90°-rotation font will be described. In such a basic operation, when the operator specifies the on-screen display controlled by the 90°-rotation font using the key 6, the key controller supplies to the system controller 49 the control signal for the on-screen display by the 90°-rotation font. The main flow controller unit 106 of the system controller 49 reads a control software of the 90°-rotation font which is used exclusively for displaying the on-screen display by the 90°-rotation font in a on-screen display processing in an operation based on the main flow. Then, the main flow controller unit 106 supplies to the character generator 103 a control signal such a that the characters by the 90°-rotation font are generated according to the 90°-rotation font control software. The character generator 103 supplies an address signal tot he font ROM 100 based on an address table by the control signal. Thus, the character generator 103 reads the 90°-rotation font to generate 90 degrees rotated character data.

The 90 degrees rotated character data generated by the character generator 103 are supplied to the character mixer circuit 38. The character mixer circuit 38 mixes the picture data supplied from D/A converter 37 with the character data supplied from the character generator 103. In this way, the monitor 2 displays the picture and the characters of the on-screen display. In this case, in the character mixer circuit 38, for example, the character data are multiplexed in the form of an analogue RGB signal allocated in a portion of the vertical blanking period which is a temporal gap of an image signal forming the picture data.

At this time, if the picture size is set by the key 6 on the basis of the on-screen display of the size setting menu screen displayed on the monitor 2, the key controller supplies the picture size setting signal to the system controller 49. The system controller 49 supplies the picture size setting signal to the CPU 34. The CPU 34 reads out the control data from the memory 35 and generates the picture size setting signal and the signal required for generating the window based on the control data. The CPU 34 supplies the picture size setting signal and the signal required for generating the window to the memory controller 33. The memory controller 33 generates the window signal based on these signals and at the same time controls so that only the picture within the window may be output to the monitor 2 and the printer 3.

When the operator presses the key 6 to specify the printing out, since only the picture within the window is supplied to the head controller 43 of the printer 3 according to the window signal produced by the memory controller 17, only the print data in a one to one correspondence with the picture quarried by the window displayed in the monitor 2 is supplied to the head 44. This enables the proper size of print to be printed out by altering the window size through the key 6 based on the horizontal on-screen display of the vertically elongated monitor 2, thereby specifying the print size and causing the picture size to be altered correspondingly to the specified window size.

The video processing apparatus according to the present embodiment described above comprises the camera 1 for imaging the subject through the optical system to convert the image into the electrical signal for outputting it as the picture data, the memory 32 for storing the picture data, the system controller 49 for generating the character data connected with controlling the picture data, the monitor 2 for displaying the picture of the picture data, the monitor 2 for displaying the picture of the picture data stored in the memory 32 and the characters of the character data generated by the system controller 49, and the printer 3 doe printing the picture displayed in the monitor 2 based ont on the character data, wherein the characters rotated against the picture are displayed when the picture and the characters are displayed on the monitor 2, so that it is possible to rotate the display of the characters connected with printing correspondingly to the direction of the picture, whereby enabling the operability to be improved by generating the character in such a direction that the operator can read them easily.

Moreover, in the video processing apparatus according to the present embodiment described above, since the system controller 49 is arranged to make the characters to be rotated against the picture by 90° in the predetermined direction in the monitor 2, when the image of the subject by the camera 1 is rotated by 90° in the predetermined direction and then the display of the picture and the characters by the monitor 2 is rotated by 90° in the opposite direction to the predetermined direction, it is possible to display in the horizontal direction the characters forming the on-screen display connected with printing when the vertically elongated picture is displayed in the display means positioned to be vertically elongated, thereby allowing the operability to be improved.

Furthermore, more particularly, the functional block of the on-screen display of the system controller shown in FIG. 3 is constructed, for example, as shown in FIG. 10. In FIG. 10, the system controller 49 comprises the font ROM 100 in which data of, for example, alphabet or character pattern of each country of Europe are stored, the character generator 103 for generating the character data by reading the character pattern stored in the font ROM 100, and the main flow controller unit 106 for controlling the on-screen display based on the main operation flow. The font ROM 100 includes the normal font 101 for forming the characters in the scanning line direction of the monitor, and the 90°-rotation font 102 for forming the characters in the direction rotated by 90° relative to the scanning line direction of the monitor.

Figure 11:
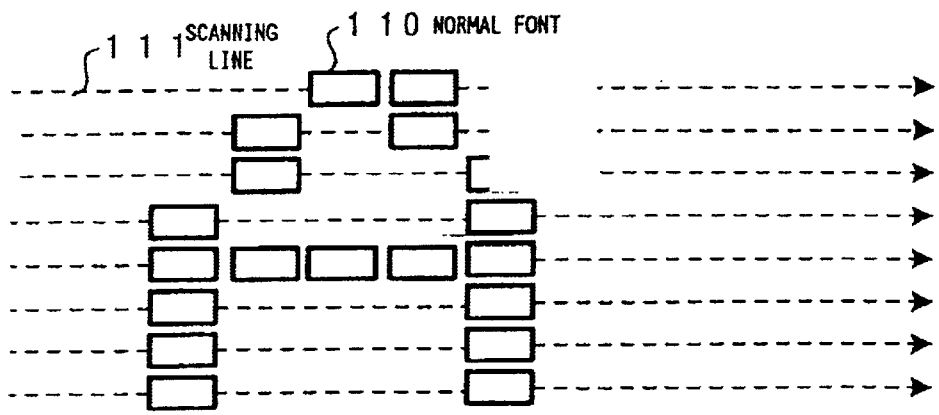
FIG. 11 is a diagram showing a normal font of the video processing according to the embodiment of the present invention.
Figure 12:
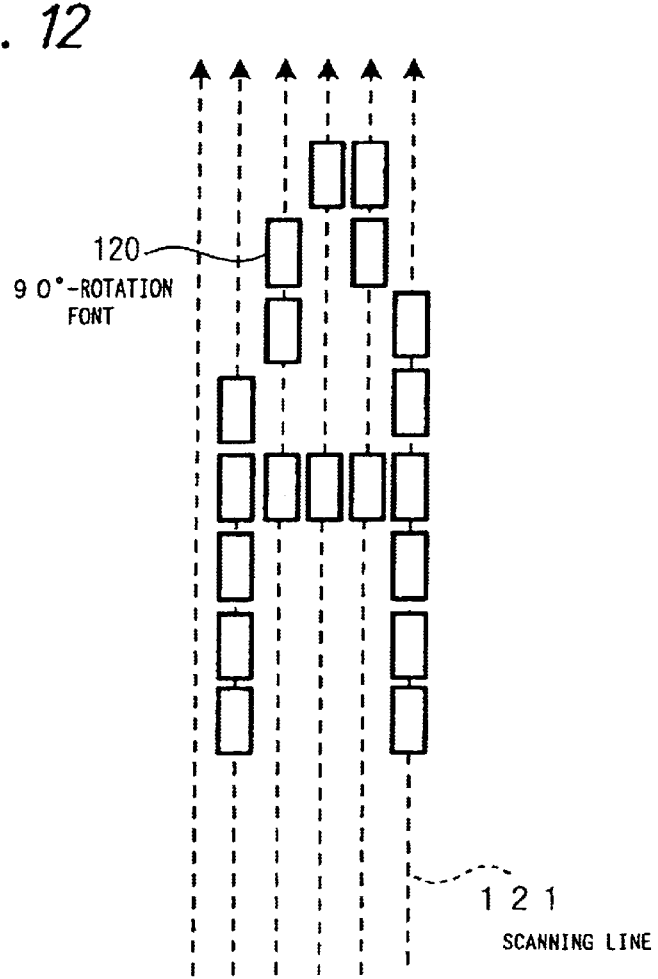
FIG. 12 is a diagram showing a 90° rotation font of the video processing according to the embodiment of the present invention.

Here, the construction of the normal font is shown in FIG. 11, the normal font 110 is comprised of, for example, 8 dots in the vertical direction and 5 dots in the horizontal direction. Each dot in the vertical direction is constructed so as to correspond to direction of eight scanning lines 111. In contrast, the construction of the 90°-rotation font is shown in FIG. 12. In FIG. 12, the 90°-rotation font 121 is comprised of, for example, 8 dots in the vertical direction and 5 dots in the horizontal direction. Each dot in the horizontal direction is constructed so as to correspond to direction of five scanning lines 121. In other words, the normal font 110 is constructed so that a ratio of the vertical length and the horizontal length in each dot may be 3:4 correspondingly to a ratio 3:4, the ratio of the vertical length and the horizontal length of the usual monitor horizontally elongated, whereas the 90°-rotation font 120 is constructed so that the radio of the vertical length and the horizontal length in each dot may be 4:3 correspondingly to a ratio 4:3, the ratio of the vertical length and the horizontal length of the 90°-rotated, thus vertically elongated monitor. Therefore, the normal font 110 is comparatively elongated in the horizontal direction, whereas the 90°-rotation font 120 is comparatively elongated in the vertical direction.

The character generator 103 includes the character generator unit 104 for generating the character data, and the font address generator unit 105 for generating an address to access the normal font 101 or the 90°-rotation font 102 based ont eh address table. The main flow controller unit 106 comprises an on-screen display control unit 107 controlling the processing of the on-screen display during the main flow operation which controls various operations, a normal font control software 108 for generating the characters in the scanning line direction of the monitor, and a 90°-rotation font control software 109 for generating the character in the direction rotated by 90° against the scanning line direction of the monitor.

In this regard, the on-screen display control unit 107 constitutes a timing generator unit for generating various timing signals relating to the screen display from the horizontal/vertical synchronizing signals and a display clock. The character generator unit 104 constitutes a converter section for converting the character data read out of the font ROM 100 synchronously with the horizontal/vertical synchronizing signal into the analogue RGB signal.

The normal font control software 108 has a function which makes on-screen display control unit 107 to control so as to generate various timing signals relating to the screen display by the normal font from the horizontal/vertical synchronizing signal and the display clock, makes the font address generator unit 105 to generate the address in which the normal font is stored based on the address table so as to read the normal font 101, and makes the character generator unit 104 to read the character data of the normal font synchronously with the horizontal/vertical synchronizing signal and to convert them into the analogue RGB signal for forming the characters in the scanning line direction of the horizontally elongated monitor.

Also, the 90°-rotation font control software 109 has a function which makes the on-screen display control unit 107 to control so as to generate various timing signals relating to the screen display by the 90°-rotation font from the horizontal/vertical synchronizing signal and the display clock, makes the font address generator unit 105 to generate the address in which the 90°-rotation font is stored based on the address table so as to read the 90°-rotation font 102, and makes the character generator unit 104 to read the character data of the 90°-rotation font synchronously with the horizontal/vertical synchronizing signal and to convert them into the analogue RGB signal for forming the characters in the direction rotated by 90° against the scanning line direction of the vertically elongated monitor.

The functional block for the on-screen display of the system controller constructed in this manner operates as follows. First of all, the operation of the on-screen display by the normal font will be described. By inputting through the key 6, the control signal for the on-screen display by the normal font is supplied from the key controller to the main flow controller unit 106. Then, the normal font control software 108 operates. In other words, by the normal font control software 108, the respective parts are controlled to operate as follows. The on-screen display control unit 107 generates the various timing signals relating to the on-screen display by the normal font from the horizontal/vertical synchronizing signal and the display clock. These timing signals are supplied to the character generator 103. Then, the font address generator unit 105 of the character generator 103 generates the address in which the normal font is stored based on the address table for reading the normal font 101 out of the font ROM 100. Also, the character generator unit 104 operates to read the character data of the normal font synchronously with the horizontal/vertical synchronizing signal and to convert them into the analogue signal for forming the characters in the scanning line direction of the horizontally elongated monitor.

Figure 13A:
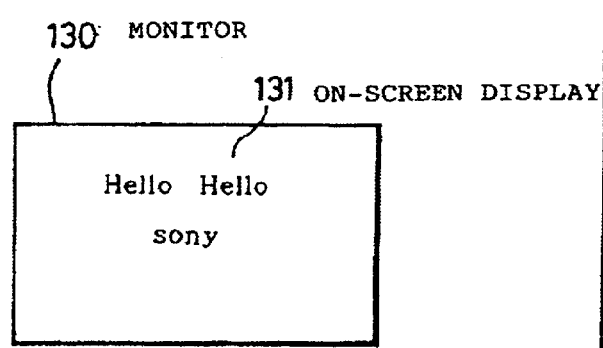
FIG. 13A is a diagram showing an on-screen display displayed on a monitor located with its long side in a horizontal direction and FIG. 13B is a diagram showing an on-screen display displayed on a monitor located with its long side in a vertical direction.
Figure 14A:
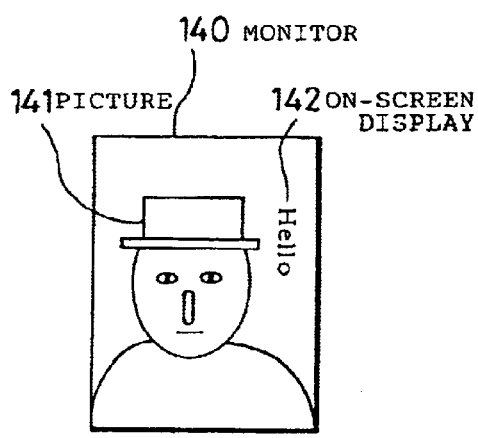
FIG. 14A is a diagram showing the on-screen display with the normal font and FIG. 14B is a diagram showing the on-screen display with the 90° rotation font.

In this way, the on-screen display 131 is displayed in the scanning line (horizontal) direction in the monitor 130 horizontally elongated as is shown in FIG. 13A. In this case, in the monitor 140 vertically elongated as shown in FIG. 14A, the on-screen display 141 is displayed in the scanning line (vertical) direction together with the picture 45.

Next, the operation of the on-screen display by the 90°-rotation font will be described. By inputting through the key 6, the control signal for the on-screen display by the 90°-rotation font is supplied from the key controller to the main flow controller unit 106. Then, the 90°-rotation font control software 109 operates. In other words, by the 90°-rotation font control software 109, the respective parts are controlled to operate as follows. The on-screen display control unit 107 generates the various timing signals relating to the on-screen display by the 90°-rotation font from the horizontal/vertical synchronizing signal and the display clock. These timing signals are supplied to the character generator 103. Then, the font address generator unit 105 of the character generator 103 generates the address in which the 90°-rotation font is stored based on the address table for reading the 90°-rotation font 102. The character generator unit 104 operates to read the character data of the 90°-rotation font synchronously with the horizontal/vertical synchronizing signal and to convert them into the analogue signal for forming the characters in the direction rotated by 90° against the scanning line direction of the vertically elongated monitor.

Figure 13B:
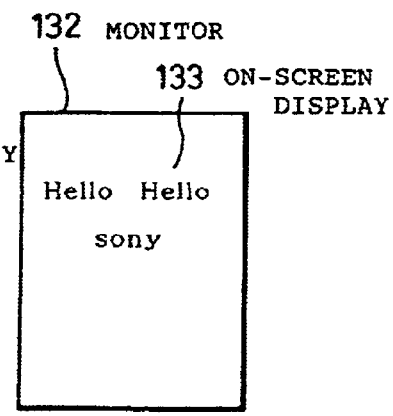
Figure 14B:
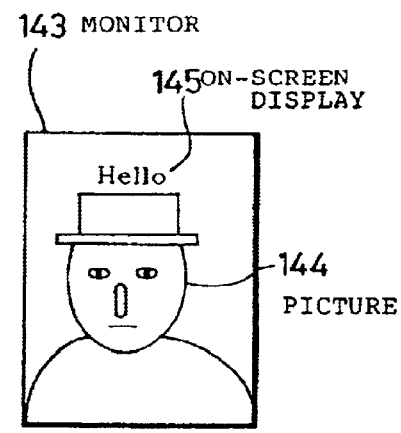

In this may, the on-screen display 133 is displayed in the (horizontal) direction rotated by 90° against the scanning line direction on the monitor 132 vertically elongated as is shown in FIG. 13B. In this case, on the monitor 142 vertically elongated as shown in FIG. 14B, the on-screen display 145 is displayed in the horizontal direction rotated by 90° against the scanning line direction together with the picture 144.

Since the character data can thus be generated correspondingly to any of the normal font or the 90°-rotation font by the control signal for selecting the font supplied from the key controller due to the input through the key 6, it is possible to produce arbitrarily the on-screen display connected with the control of printing the attesting photograph for the passport of each country.

In the above example, while the embodiment has been described in which, when the 90 degrees rotated picture is imaged by positioning in advance the video camera to be rotated by 90° and then positioning the monitor to be rotated backward by 90° so as to display the vertically elongated picture, the 90 degrees so as to display the vertically elongated picture, the 90°-rotation font relative to the normal font is provided for displaying the on-screen display for controlling the printer in the horizontal direction of the vertically elongated monitor, for example, if the camera is used in the usual horizontally elongated position, it is sufficient that the normal font is sued for the on-screen display. Also, if the camera is used in the normal position and only the monitor is rotated by 90° to be in the vertically elongated position, it is sufficient to use the 90°-rotation font.

Moreover, in the above example, while the embodiment which is used for the attesting photograph has been described, the present invention is applicable to, for example, printing the portrait on a calling card or printing the vertically elongated picture on various prepaid cards or credit cards such as the telephone card. Furthermore, the present invention is not limited to the field of the attesting photograph of the passport or the like, it can be utilized for a photographic analysis of a golf swing, etc. and for photographing in a recreational facilities.

In addition, in the video processing apparatus according to the above-mentioned embodiment, since the system controller 49 has the 90°-rotation font in which the characters displayed on the monitor 2 are rotated by 90° against the scanning line direction of the monitor 2, the vertically elongated font which is exclusively used for displaying the characters forming the on-screen display connected with printing in the horizontal direction can be provided when the vertically elongated picture is displayed in the vertically elongated monitor 2, thereby enabling the on-screen display to be displayed within an effective display area in the vertically elongated monitor 2.

Again, in the video processing apparatus according to the present embodiment described above, since the system controller 49 includes both the 90°-rotation font in which the characters displayed on the monitor 2 is rotated by 90° against the scanning line direction of the monitor 2 and the normal font to be switched therebetween correspondingly to the respective positions of the camera 1 and the monitor 2, it is possible to display the characters forming the on-screen display connected with printing in the horizontal direction by only adding a simple construction for only changing the font address in parallel to the construction for reading the normal font, without adding any other controller for another control system which rotates the normal font by 90°, and by switching between the case where the horizontally elongated picture is displayed in the normal horizontally elongated monitor 2 and the case where the vertically elongated picture is displayed in the vertically elongated monitor 2.

Also, in the video processing apparatus according to the present embodiment described above, since the character data generated by the system controller 49 are the control items for printing of the printer 3, the control items for making the printer 3 to perform the printing is made easy to be read, which in turn leads to the improvement of its operability.

The following effects can be achieved by the present invention.

The video processing apparatus according to the present invention comprises the imaging means for imaging the subject through the optical system to convert the image into the electrical signal for outputting it as the picture data, the storage means for storing the picture data, the character data generator means for generating the character data connected with controlling the picture data, the display means for displaying the picture of the picture data stored in the storage means and the characters of the character data generated by the character data generating means, and the printer means for printing the picture displayed in the display means according to the character data, wherein the characters are rotated against the picture for display when the picture and rotated against the picture for display when the picture and the characters are displayed in the display means, so that it is possible to rotate the display of the characters connected with printing correspondingly to the picture direction, thereby causing the characters to be formed in the direction where the operator can easily red them, which in turn leads to the advantageous effect of the operability improvement. Moreover, in the video processing apparatus according to the present invention described above, since, when the image of the subject by the imaging means is rotated in the predetermined direction by 90° and then the display of the picture and the characters by the display means is rotated in the direction opposite to the predetermined direction by 90°, the character data generator means is arranged to make the characters to be rotated against the picture in the predetermined direction by 90° for display in the display means, it is possible to display the characters forming the on-screen display connected with printing in the horizontal direction when displaying the vertically elongated picture in the vertically elongated display means, which results in the advantageous effect of the operability improvement.

Furthermore, in the video processing apparatus according to the present invention described above, since the character data generator means includes the 90 degrees against the scanning line direction of the display means, it is possible to provide the vertically elongated font which is exclusively used for displaying the characters forming the on-screen display connected with printing in the horizontal direction, which in turn leads to the advantageous effect such that it is possible to perform the on-screen display within the effective display area in the vertically elongated display means.

Also, in the video processing apparatus according to the present invention described above, since the character data generator means includes both the 90°-rotation font in which the characters displayed in the display means is rotated by 90° against the scanning line direction of the display means and the normal font, thereby allowing the 90°-rotation font and the normal font to be switched therebetween correspondingly to the respective positions of the imaging means and the display means, the advantageous effect is obtained, in which it is possible to display the characters forming the on-screen display connected with printing in the horizontal direction by only adding the simple construction for only changing the font address in parallel to the construction for only changing the font address to the construction for reading the normal font without adding any other controller for another control system which rotates the normal font by 90° and by switching between the case where the horizontally elongated picture is displayed in the normal horizontally elongated display means and the case where the vertically elongated picture is displayed in the vertically elongated display means.

Again, in the video processing apparatus according to the present invention described above, since the character data generated by the character data generator means are the control items for the printing of the printer means and these control items for causing the printer of the printer means and these control items for causing the printer means to perform the printing is made easy to be read, the advantageous effect is obtained, in which the operability can be improved.

INDUSTRIAL APPLICABILITY

The video processing apparatus of the above embodiments can be used for the attesting photograph such as IVP (instant video portrait) in a photobooth with no clerk or a studio.

What is claimed is:

1. A video processing apparatus comprising:
    an imaging means for imaging an object through an optical system to obtain an electric signal through conversion and outputting a signal as a video data;
    a display means for displaying a picture of said video data in a predetermined picture frame;
    a printing means for printing the picture in said picture frame of said video data;
    a print size selecting means for selecting a print size of the picture to be printed by said printing means;
    a pixel-number determining means for determining the number of pixels of said video data corresponding to the print size selected by said print size selecting means; and
    a video data processing means for processing said video data based on the number of pixels determined by said pixel-number determining means so that the pixels of said video data output from said imaging means should be in one-to-one correspondence with the pixels of said video data printed by said printing means and so that the number of pixels of said video data output from said imaging means is the same as the number of pixels of said video data printed by said printing means,
    wherein said pixel-number determining means determines the number of vertical-direction pixels based on a transmission system of said video data.

2. A video processing apparatus according to claim 1, wherein said pixel-number determining means determines the number of horizontal-direction pixels based on the head density of said printing means.

3. A video processing apparatus according to claim 1, further comprising:
    a horizontal and vertical cutting means for cutting the picture of said video data in the horizontal direction or the vertical direction based on the number of pixels determined by said pixel-number determining means to thereby generate a picture frame corresponding to said number of pixels on said display means.

4. A video processing apparatus according to claim 1, further comprising:
    a horizontal and vertical cutting means for cutting the picture of said video data in the horizontal direction or the vertical direction based on the number of pixels determined by said pixel-number determining means to thereby print an image corresponding said number of pixels by said printing means.

5. A video processing apparatus according to claim 1, wherein said video data processing means uses the same sampling frequency for sampling the pixels of said video data output from said imaging means and for sampling the pixels of said video data to be printed by said printing means.

6. A video processing apparatus according to claim 1, wherein the pixels of said video data displayed on said display means are decimated in a predetermined ratio relative to the video data obtained by the image pickup of said imaging means.

7. A video processing apparatus according to claim 1, wherein said print size selecting means directly sets values by input using a key.

8. A video processing apparatus according to claim 1, wherein said print size selecting means selects one from a plurality of preset values.

9. A video apparatus according to claim 1, wherein said imaging means has a zooming function for adjusting the zooming operation of said optical system.

10. A printing apparatus for printing an image based on a source video data on a printing paper, comprising:
   a storage means for storing said source video data;
   a reading means for reading a video image stored in said storage means;
   a printing means for printing an image based on the video data read out by said reading means on said printing paper;
   a print size selecting means for selecting a print size of an image to be printed on said printing paper; and
   a control means for controlling said reading means and said printing means so that pixels of said source video data should be in one-to-one correspondence with pixels of the video data to be printed on said printing paper and so that the number of pixels of the read video data is the same as the number of pixels of said video data to be printed on said printing paper,
   wherein said control means determines, in response to the print size selected by said print size selecting means and a transmission system of said source video data, the number of pixels of a video data to be printed on said printing paper.

11. A printing apparatus according to claim 10, wherein said printing means comprises a head drive means for driving a head for printing said read-out video data on the printing paper and a paper feeding means for mechanically conveying said printing paper relative to said head.

12. A printing apparatus according to claim 11, wherein said control means controls a read sampling frequency of said reading means in response to the head density of the head.

13. A printing apparatus according to claim 11, wherein said control means controls a read sampling frequency of said reading means and a paper feed pitch of said paper feeding means in response to a head density of said head.

14. A printing apparatus according to claim 10, further comprising:
   a print size selecting means for selecting a print size of an image to be printed on said printing paper, wherein said controlling means controls a read sampling frequency of said reading means and a paper feed pitch of said paper feeding means in response to the print size selected by said print size selecting means.

15. A printing apparatus according to claim 10, further comprising:
   a print size selecting means for selecting a print size of an image to be printed on said printing paper, wherein said controlling means determines, in response to the print size selected by said print size selecting means, the number of pixels of a video data to be printed on said printing paper and controls a read sampling frequency of said reading means and a paper feed pitch of said paper feeding means in response to the determined number of pixels and a head density of said head.

16. A printing apparatus according to claim 10, further comprising:
   wherein said control means controls a read sampling frequency of said reading means and a paper feed pitch of said paper feeding means in response to the determined number of pixels and a head density of said head.

* * * * *